(12) United States Patent
Campos Macias et al.

(10) Patent No.: US 12,518,155 B2
(45) Date of Patent: Jan. 6, 2026

(54) METHODS AND APPARATUS TO FACILITATE EFFICIENT KNOWLEDGE SHARING AMONG NEURAL NETWORKS

(71) Applicant: Intel Corporation, Santa Clara, CA (US)

(72) Inventors: Leobardo E. Campos Macias, Guadalajara (MX); Ranganath Krishnan, Hillsboro, OR (US); David Gomez Gutierrez, Tlaquepaque (MX); Rafael De La Guardia Gonzalez, Guadalajara (MX); Nilesh Ahuja, Cupertino, CA (US); Javier Felip Leon, Hillsboro, OR (US); Jose I. Parra Vilchis, Guadalajara (MX); Anthony K. Guzman Leguel, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 1037 days.

(21) Appl. No.: 17/129,789

(22) Filed: Dec. 21, 2020

(65) Prior Publication Data

US 2021/0110264 A1    Apr. 15, 2021

(51) Int. Cl.
  *G06N 3/08* (2023.01)
  *G06N 3/045* (2023.01)
  *G06N 3/047* (2023.01)
(52) U.S. Cl.
  CPC ............... *G06N 3/08* (2013.01); *G06N 3/045* (2023.01); *G06N 3/047* (2023.01)

(58) Field of Classification Search
  CPC ............ G06N 3/08; G06N 3/047; G06N 3/045
  See application file for complete search history.

(56) References Cited

U.S. PATENT DOCUMENTS

| 2005/0149463 A1* | 7/2005 | Bolt | ........................ G06N 3/08 706/26 |
| 2009/0276385 A1* | 11/2009 | Hill | ......................... G06N 3/08 706/25 |

(Continued)

FOREIGN PATENT DOCUMENTS

| CN | 110462638 A | 11/2019 |
| CN | 111898764 A | 11/2020 |

OTHER PUBLICATIONS

Neal et al., "Bayesian Learning for Neural Networks," University of Toronto, 1995, 195 pages.

(Continued)

*Primary Examiner* — Alexey Shmatov
(74) *Attorney, Agent, or Firm* — Hanley, Flight & Zimmerman, LLC

(57) ABSTRACT

Methods, apparatus, systems and articles of manufacture are disclosed to facilitate knowledge sharing among neural networks. An example apparatus includes a trainer to train, at a first computing system, a first Bayesian Neural Network (BNN) on a first subset of training data to generate a first weight distribution, and train, at a second computing system, a second BNN on a second subset of the training data to generate a second weight distribution, the second subset of the training data different from the first subset of training data. The example apparatus includes a knowledge sharing controller to generate a third BNN based on the first weight distribution and the second weight distribution.

23 Claims, 14 Drawing Sheets

(56) References Cited

U.S. PATENT DOCUMENTS

| | | | | |
|---|---|---|---|---|
| 2016/0034811 | A1* | 2/2016 | Paulik | G06N 3/045 706/20 |
| 2019/0012592 | A1* | 1/2019 | Beser | G06N 3/063 |
| 2019/0102908 | A1* | 4/2019 | Yang | G06V 10/82 |
| 2019/0251445 | A1* | 8/2019 | Movshovitz-Attias | G06N 3/084 |
| 2020/0065667 | A1* | 2/2020 | Agarwal | G06N 7/01 |
| 2020/0168301 | A1* | 5/2020 | Pyzer-Knapp | G16C 20/30 |
| 2020/0410364 | A1* | 12/2020 | Willers | G06N 3/0895 |
| 2021/0034947 | A1* | 2/2021 | Wang | G06N 3/065 |
| 2021/0117792 | A1 | 4/2021 | Ahuja et al. | |
| 2022/0067491 | A1* | 3/2022 | Vengertsev | G11C 16/10 |
| 2022/0373612 | A1* | 11/2022 | Tharmakulasingam | G06N 3/045 |
| 2023/0116117 | A1 | 4/2023 | Shao et al. | |

OTHER PUBLICATIONS

Kendall et al., "What Uncertainties Do We Need in Bayesian Deep Learning for Computer Vision?," Oct. 5, 2017, 12 pages.
Wang et al., "A Survey on Bayesian Deep Learning," Jul. 2, 2020, Accessed: Jun. 4, 2020, [http://arxiv.org/abs/1604.01662], 35 pages.
Lesort et al., "Continual Learning for Robotics: Definition, Framework, Learning Strategies, Opportunities and Challenges," Nov. 22, 2019, Accessed: Jun. 4, 2020, [http://arxiv.org/abs/1907.00182], 35 pages.
Fort et al., "Deep Ensembles: A Loss Landscape Perspective," Dec. 2019, Accessed: Jun. 8, 2020, [http://arxiv.org/abs/1912.02757], 15 pages.
Pearce et al., "Bayesian Neural Network Ensembles," Nov. 2018, Accessed: Jun. 8, 2020, [http://arxiv.org/abs/1811.12188], 5 pages.
Kirkpatrick et al., "Overcoming catastrophic forgetting in neural networks," Proc. Natl. Acad. Sci. U. S. A., vol. 114, No. 13, pp. 3521-3526, Mar. 28, 2017, [www.pnas.org/cgi/doi/10.1073/pnas.1611835114], 6 pages.
Nguyen et al., "Variational Continual Learning," ICLR 2018, May 20, 2018, Accessed: Jun. 8, 2020, [https://arxiv.org/abs/1710.10628], 18 pages.
Rebuffi et al., "iCaRL: Incremental Classifier and Representation Learning," Apr. 14, 2017, Accessed: Jun. 8, 2020, [http://arxiv.org/abs/1611.07725], 15 pages.
Li et al., "Federated Learning: Challenges, Methods, and Future Directions," Aug. 21, 2019, Accessed: Jun. 8, 2020, [https://arxiv.org/abs/1908.07873], 21 pages.
Farquhar et al., "A Unifying Bayesian View of Continual Learning," Third workshop on Bayesian Deep Learning (NeurIPS 2018), Montréal, Canada, Feb. 18, 2019, Accessed: Jun. 4, 2020, [https://arxiv.org/abs/1505.05424], 6 pages.
Blundell et al., "Weight Uncertainty in Neural Networks," May 21, 2015, Accessed: Jun. 8, 2020, [https://arxiv.org/abs/1505.05424], 10 pages.
De Lange et al., "A continual learning survey: Defying forgetting in classification tasks," May 26, 2020, Accessed: Jun. 4, 2020, [https://arxiv.org/abs/1909.08383], 26 pages.
Taiwan Intellectual Property Office, "Search Report," issued in connection with Taiwan Patent Application No. 110134399, mailed on Aug. 18, 2025, 2 Pages, [with English Translation].
Taiwan Intellectual Property Office, "Notice of Examination Opinion," issued in connection with Taiwan Patent Application No. 110134399, mailed on Aug. 18, 2025, 14 Pages, [with English Translation].

* cited by examiner

METHODS AND APPARATUS TO FACILITATE EFFICIENT KNOWLEDGE SHARING AMONG NEURAL NETWORKS

FIELD OF THE DISCLOSURE

This disclosure relates generally to neural networks, and, more particularly, to methods and apparatus to facilitate efficient knowledge sharing among neural networks.

BACKGROUND

In recent years, machine learning and/or artificial intelligence have increased in popularity. For example, machine learning and/or artificial intelligence may be implemented using neural networks. Neural networks are computing systems inspired by the neural networks of human brains. A neural network can receive an input and generate an output. The neural network can be trained (e.g., can learn) based on feedback so that the output corresponds to a desired result. Once trained, the neural network can make decisions to generate an output based on any input. Neural networks are used for the emerging fields of artificial intelligence and/or machine learning. A Bayesian neural network is a particular type of neural network that includes neurons that output a variable weight as opposed to a fixed weight. The variable weight falls within a probability distribution defined by a mean value and a variance determined during training of the Bayesian neural network.

BRIEF DESCRIPTION OF THE DRAWINGS

The figures are not to scale. In general, the same reference numbers will be used throughout the drawing(s) and accompanying written description to refer to the same or like parts.

Figure 1:
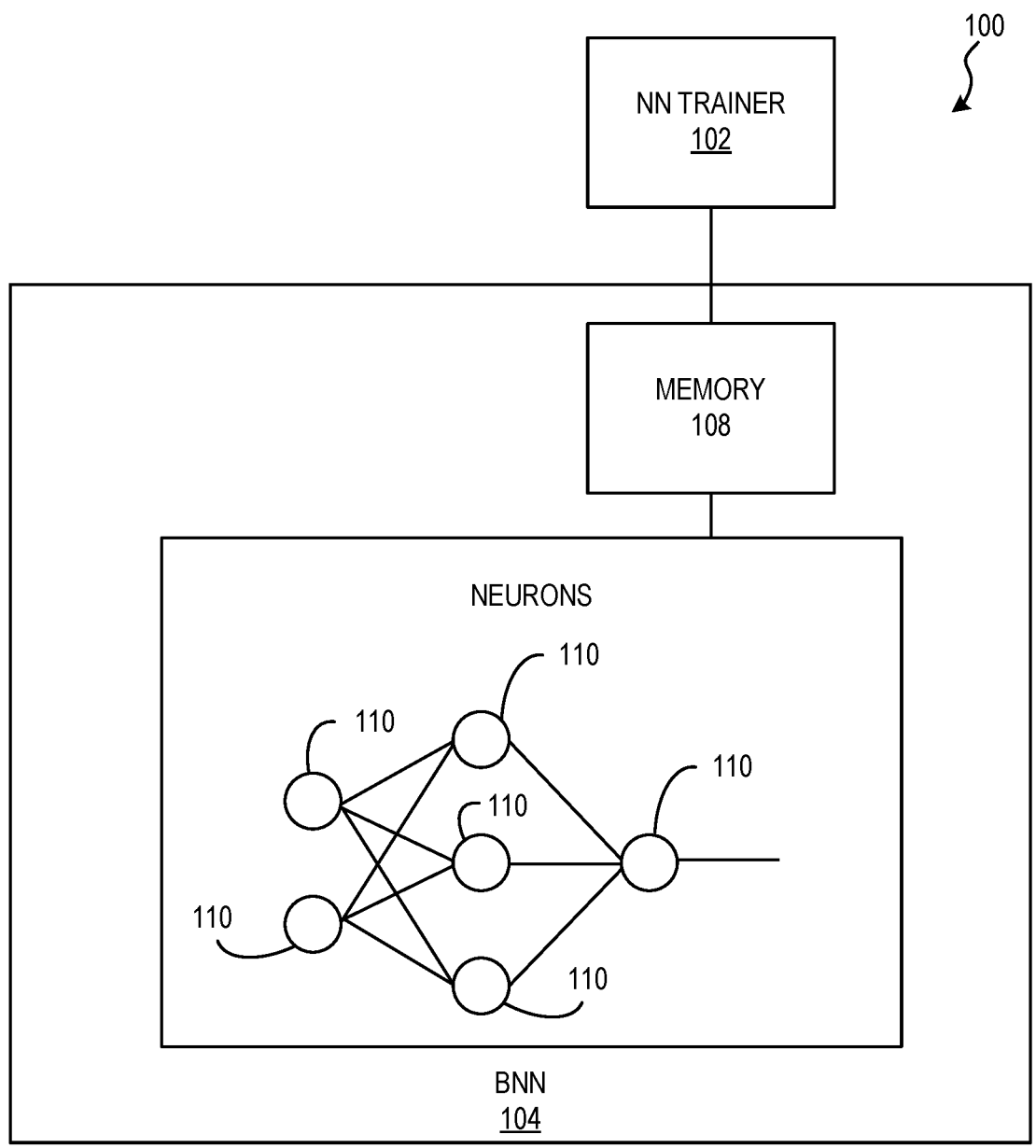
FIG. 1 is a schematic illustration of an example Bayesian neural network.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Bayesian Neural Networks (BNNs) are machine learning neural networks capable of computing an epistemic uncertainty (e.g., systemic uncertainty) and an aleatoric uncertainty (e.g., statistical uncertainty) at inference. For example, a system (e.g., a computing system) may include at least one or more agents (e.g., computing devices, computing processors, computing systems, etc.) operating under different environments, learning independently using BNNs. That is, the system can use an ensemble of BNNs. In such a system, there may exist a data set including a first subset of data and a second subset of data. Further, in such a system there may exist a first BNN operating on a first computing device in a first computing environment trained using the first subset of data. Similarly, there may exist a second BNN operating on a second computing device in a second computing environment trained using the second subset set of data. Accordingly, it may not be computationally efficient or feasible to share the training knowledge among the first BNN and the second BNN so that either the first BNN or the second BNN can perform inference accurately on the data set (e.g., both the first subset of data and the second subset of data).

For example, two or more mobile agents can learn a policy (e.g., intent prediction, collision avoidance, etc.) under different regions of the environment (e.g., each agent is trained in a different computing environment using different subsets of data). Thus, the mobile agents determine different corner cases. In examples disclosed herein, the mobile agents share their knowledge, resulting in performance similar to if each mobile agent was trained under the complete environment (e.g., trained using all subsets of the data). Accordingly, examples disclosed herein accelerate the training time to achieve a desired performance.

Previous techniques have explored ensemble approaches in the context of deterministic neural networks in which all members of the ensemble share the same network topology but have different sets of weights and parameters. For example, previous techniques determine network parameters using bagging and boosting (e.g., training the members of the ensemble with different random initializations). Previous techniques may also determine the parameters of the ensemble by randomized sampling and regularization to provide a consistent estimator of the Bayesian posterior (e.g., the individual members are deterministic neural networks, but the ensemble collectively behaves as a BNN).

Learning from new and previously unseen data has been explored in the domain of continual learning. In cases of continual learning, parameters of a network are updated when new and previously unseen data is obtained. However, continual learning is often associated with catastrophic forgetting, a condition in which the neural network forgets old data while learning from new data. Previous techniques to mitigate catastrophic forgetting include determining the relative importance of learnt parameters by non-Bayesian and/or Bayesian techniques, and/or any other technique that requires storing previous data samples.

Some example continuous learning techniques update parameters of a single network rather than maintaining an ensemble of models. Such previous techniques are associated with catastrophic forgetting (e.g., the network forgets previous data when it is updated to learn from new data). Previous techniques to address catastrophic forgetting involve retaining a fraction of the samples of old training data. The old training data is replayed to the network when training with new data. However, as new data is obtained, the computing cost increases. For example, the size of the dataset increases, thus increasing the amount of storage required to retain old data. Examples disclosed herein decrease compute memory requirements, as the posterior distribution over weights becomes the prior in the new learning task. That is, the old training data is not stored and replayed for continual learning.

Previous ensemble approaches use federated learning. Federated learning involves learning a single global model from multiple local datasets contained in local nodes or clients (e.g., multiple local devices, servers, etc.). The general principle of federated learning consists of training local models on local data samples and exchanging parameters between local models. In some examples, the global model resides on a central server. The local nodes do not share the local datasets with the server and only communicate updates to the global model. The centralized server aggregates the updates using a weighted averaging approach, such as FedAveraging. However, this averaging technique does not account for the confidence or uncertainty from the individual models. Examples disclosed herein estimate uncertainty for the individual models and use the uncertainty during aggregation to obtain more robust outcomes.

Examples disclosed herein set forth BNNs with the same and/or different architecture for knowledge sharing. Examples disclosed herein mix the weight distributions of BNNs to generate an additional BNN. The additional BNN performs relatively better (e.g., higher accuracy) than the initial BNNs when evaluated on the complete dataset. A naïve approach to knowledge sharing is to use each of the BNNs for inference on the complete dataset and select the output of the BNN with the lowest uncertainty. However, this approach is associated with a high computing cost due to running all of the BNNs at inference.

In examples disclosed herein, weight distributions from multiple BNNs are used to capture the posterior at different local modes, resulting in a multimodal posterior that represents the data distribution. In some examples, Monte-Carlo sampling combines the knowledge gained from multiple models trained with different data distributions. Thus, the resulting BNN continues to be trained when new data is observed. That is, techniques disclosed herein are suitable for continual learning. Furthermore, techniques disclosed herein are scalable to large-scale models. Inferring posteriors in BNNs is challenging due to the difficulty of scaling large-scale datasets and complex models. Examples disclosed herein enable scalable learning in BNNs, as each network (e.g., agent) learns fully-factorized distributions that capture the weight posterior in local mode for representing the observed data distribution, and later combine the posteriors to represent the multimodal distribution observed by all of the networks.

FIG. 1 is a schematic illustration of an example neural network (NN) trainer 102 to train example BNN 104. In some examples, the NN trainer 102 implements means for training neural networks. The example BNN 104 includes an example memory 108, and example neurons 110. Although the illustrated neurons 110 of FIG. 1 include six neurons, there may be any number of neurons in any type of configuration.

The example NN trainer 102 of FIG. 1 trains the BNN 104 by selecting a mean weight and an amount of deviation for the mean weight for each of the neurons 110. Initially, the BNN 104 is untrained (e.g., the neurons are not yet weighted with a mean and deviation). To train the BNN 104, the example NN trainer 102 of FIG. 1 uses training data (e.g., input data labelled with known classifications and/or outputs) to configure the BNN 104 to be able to predict output classifications for input data with unknown classification. The NN trainer 102 may train a model with a first set of training data and test the model with a second set of the training data. If, based on the results of the testing, the accuracy of the model is below a threshold, the NN trainer 102 can tune (e.g., adjust, further train, etc.) the parameters of the model using additional sets of the training data and continue testing until the accuracy is above the threshold. After the NN trainer 102 has trained the BNN 104, the example NN trainer 102 stores the corresponding means and deviations for the respective neurons 110 in the example memory 108 of the example BNN 104. The example NN trainer 102 may be implemented in the same device as the BNN 104 and/or in a separate device in communication with the example BNN 104. For example, the NN trainer 102 may be located remotely, develop the weight data locally, and deploy the weight data (e.g., means and deviation for the respective neurons 110) to the BNN 104 for implementation.

The example BNN 104 of FIG. 1 further includes the example memory 108. The example memory 108 stores the weight data from the example NN trainer 102 in conjunction with a particular neuron. For example, a first section of the memory 108 is dedicated for a first mean value and a first variance value for a first neuron, a second section of the memory 108 is dedicated to a second mean value and a second variance value for a second neuron, etc. The mean value may be stored in the dedicated section as a bit value representative of the mean value.

The example neurons 110 of FIG. 1 receive input data, generate a weight that corresponds to a probability distribution and applies the weight to the input data to generate an output. For example, if the probability distribution of a neuron follows a standard normal distribution, the mean weight of the neuron is 0.7, and the variance of the neuron is 0.01 (e.g., the standard deviation is 0.1), then the will be a 68% chance that the neuron will output a weight between 0.6 and 0.8 (e.g., one standard deviation away from the mean), a 95% chance that the neuron will output a weight between 0.5 and 0.9 (e.g., two standard deviations away from the mean), etc. Accordingly, the weight generated by the output may be different every time a weight is generated but will follow the probability distribution.

Figure 2:
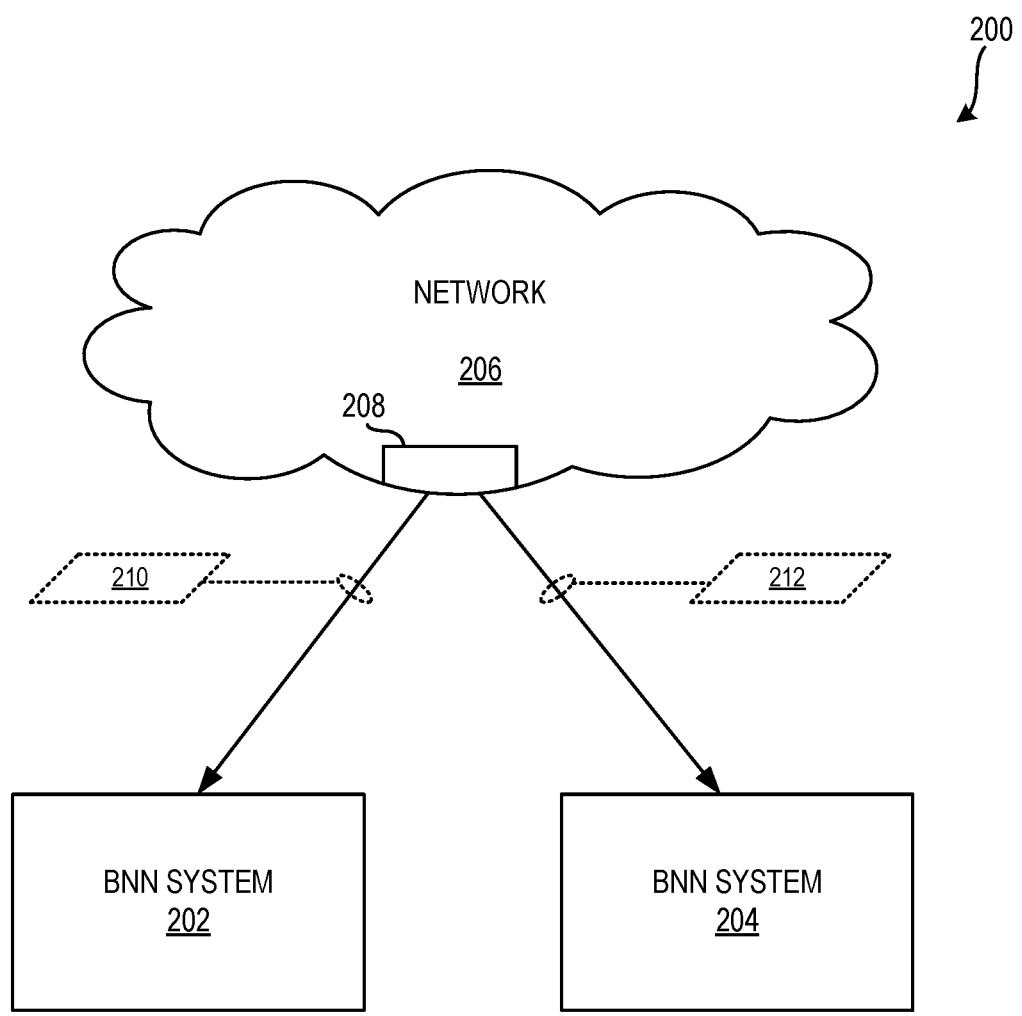
FIG. 2 illustrates an example environment including an example first BNN system and an example second BNN system.

FIG. 2 illustrates an example environment 200 including an example first BNN system 202 and an example second BNN system 204. While the illustrated example of FIG. 2 includes two BNN systems (e.g., the first BNN system 202 and the second BNN system 204), examples disclosed herein can include any number of BNN systems (e.g., three BNN systems, four BNN systems, etc.). In the example of FIG. 2, the first BNN system 202 and/or the second BNN system 204 may implement the example BNN 104 and/or the NN trainer 102 of FIG. 1. For example, the first BNN system 202 may implement the NN trainer 102 and the BNN 104 of FIG. 1. Likewise, the second BNN system 204 may implement the NN trainer 102 and the BNN 104 of FIG. 1, in an execution space separate from the first BNN system 202.

In the example environment 200 of FIG. 2, the first BNN system 202 and the second BNN system 204 communicate with an example network 206. In FIG. 2, the network 206 is a wireless network (e.g., a cloud network) configured to communicate with the first BNN system 202 and the second BNN system 204. In other examples disclosed herein, the network 206 may be implemented using any suitable wired and/or wireless network.

The network 206 further stores an example dataset 208. Such a dataset 208 includes an example first subset of data 210 and an example second subset of data 212. In some examples, the first subset of data 210 and/or the second subset of data 212 are incomplete datasets. For example, the first subset of data 210 and the second subset of data 212 can include overlapping, non-overlapping (e.g., mutually exclusive), and/or partially overlapping datasets. In operation, the network 206 transmits the first subset of data 210 to the first BNN system 202. The network 206 further transmits the second subset of data 212 to the second BNN system 204.

In the example of FIG. 2, the network 206 transmits the first subset of data 210 to the first BNN system 202 for use by the first BNN system 202 in training. Likewise, the network 206 transmits the second subset of data 212 to the second BNN system 204 for use in training. In examples disclosed herein, the first subset of data 210, the second subset of data 212, and/or more generally, the dataset 208 may correspond to any data suitable for training a BNN system (e.g., the first BNN system 202 and/or the second BNN system 204). For example, the first subset of data 210, the second subset of data 212, and/or more generally, the dataset 208 may correspond to a set of data for use in learning a policy (e.g., intent prediction, collision avoidance, etc.). Further in such an example, the dataset 208 may correspond to the modified national institute of standards and technology (MNIST) database and, as such, the first subset of data 210 may correspond to elements in the MNIST database corresponding to the digits 0, 1, 2, 3, and 4 (e.g., the classes 0-4), and the second subset of data 212 may correspond to the elements in the MNIST database corresponding to the digits 5, 6, 7, 8, and 9 (e.g., the classes 5-9). Additionally or alternatively, the first subset of data 210 may correspond to the digits 0, 1, 2, 3, 4, and 5 (e.g., the classes 0-5), and the second subset of data 212 may correspond to the digits 4, 5, 6, 7, 8, and 9 (e.g., the classes 4-9). Thus, the first BNN system 202 is associated with a first weight distribution corresponding to the first subset of data 210 and the second BNN system 204 is associated with a second weight distribution corresponding to the second subset of data 212.

Figure 3:
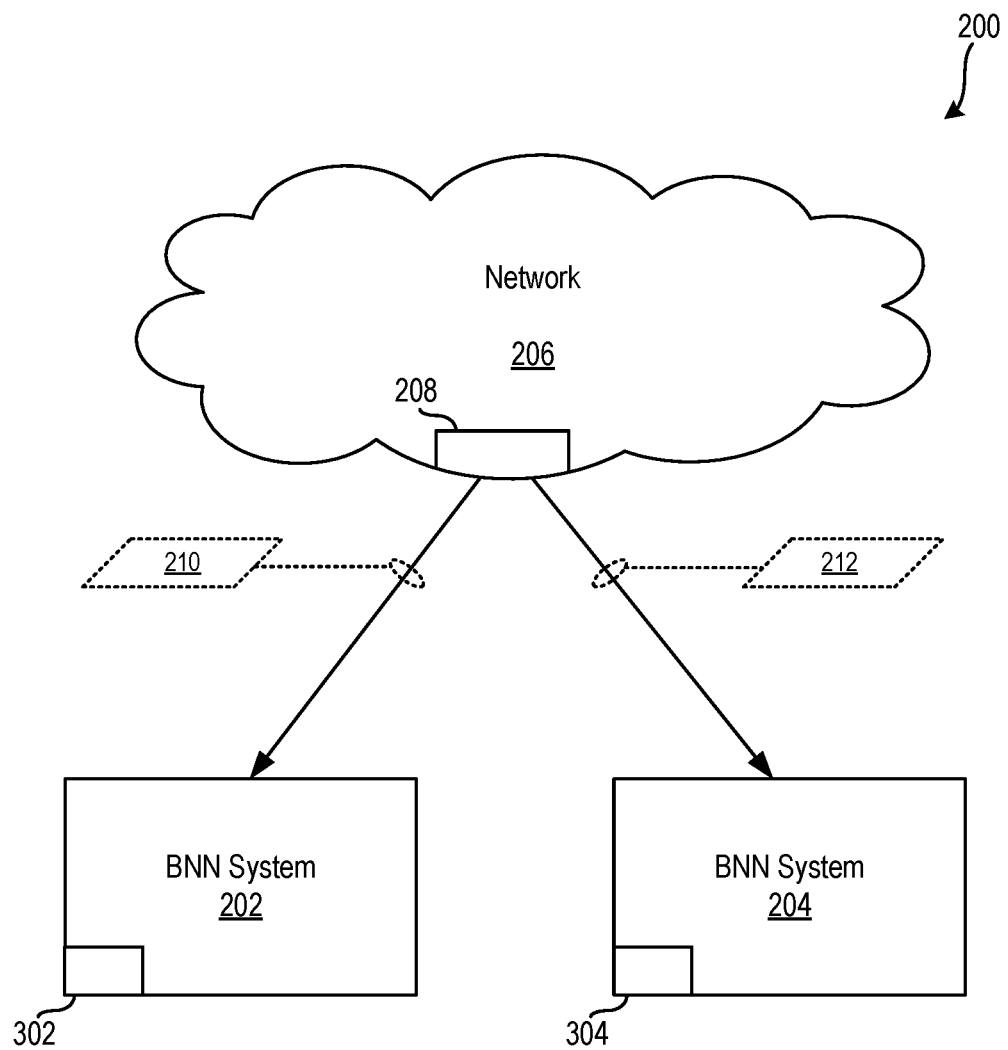
FIG. 3 illustrates the environment of FIG. 2 in which the first BNN system includes an example first knowledge sharing controller and the second BNN system includes an example second knowledge sharing controller to facilitate knowledge sharing in accordance with teachings of this disclosure.

FIG. 3 illustrates the environment 200 of FIG. 2 in which the first BNN system 202 includes an example first knowledge sharing controller 302 and the second BNN system 204 includes an example second knowledge sharing controller 304. In some examples, the first knowledge sharing controller 302 implements a first means for knowledge sharing and the second knowledge sharing controller 304 implements a second means for knowledge sharing. In some examples, the example knowledge sharing controllers 302, 304 produce a weight distribution based on input distributions from the BNNs. For example, the first knowledge sharing controller 302 accesses the weight distribution of the first BNN system 202 and receives the weight distribution of the second BNN system 204 (e.g., via the network 206) to generate a third weight distribution. Likewise, the second knowledge sharing controller 304 accesses the weight distribution of the second BNN system 204 and receives the weight distribution of the first BNN system 202 (e.g., via the network 206) to generate a fourth weight distribution. Thus, the example first BNN system 202 and the example second BNN system 204 share the parameters of their weight distributions.

In some examples, the first knowledge sharing controller 302 and/or the second knowledge sharing controller 304 use a function to generate additional weight distributions based on the input weight distributions from the BNNs. For example, the first knowledge sharing controller 302 and the second knowledge sharing controller 304 may use a Gaussian Mixture Model (GMM) to determine additional weight distributions. The mixing function for mixing the distribution of agents is described in further detail below in connection with FIGS. 6-8.

Examples disclosed herein can additionally or alternatively use any other mixing and/or generative function for knowledge sharing between agents. For example, the first knowledge sharing controller 302 and/or the second knowledge sharing controller 304 can implement a fully connected neural network trained to determine a mixing function. That is, the neural network of the first knowledge sharing controller 302 and/or the second knowledge sharing controller 304 receive as input the mean and variance of the Gaussian distributions of the BNNs and produces a Gaussian distribution. The fully connected neural network for knowledge sharing is described in further detail below in connection with FIG. 9.

Figure 4:
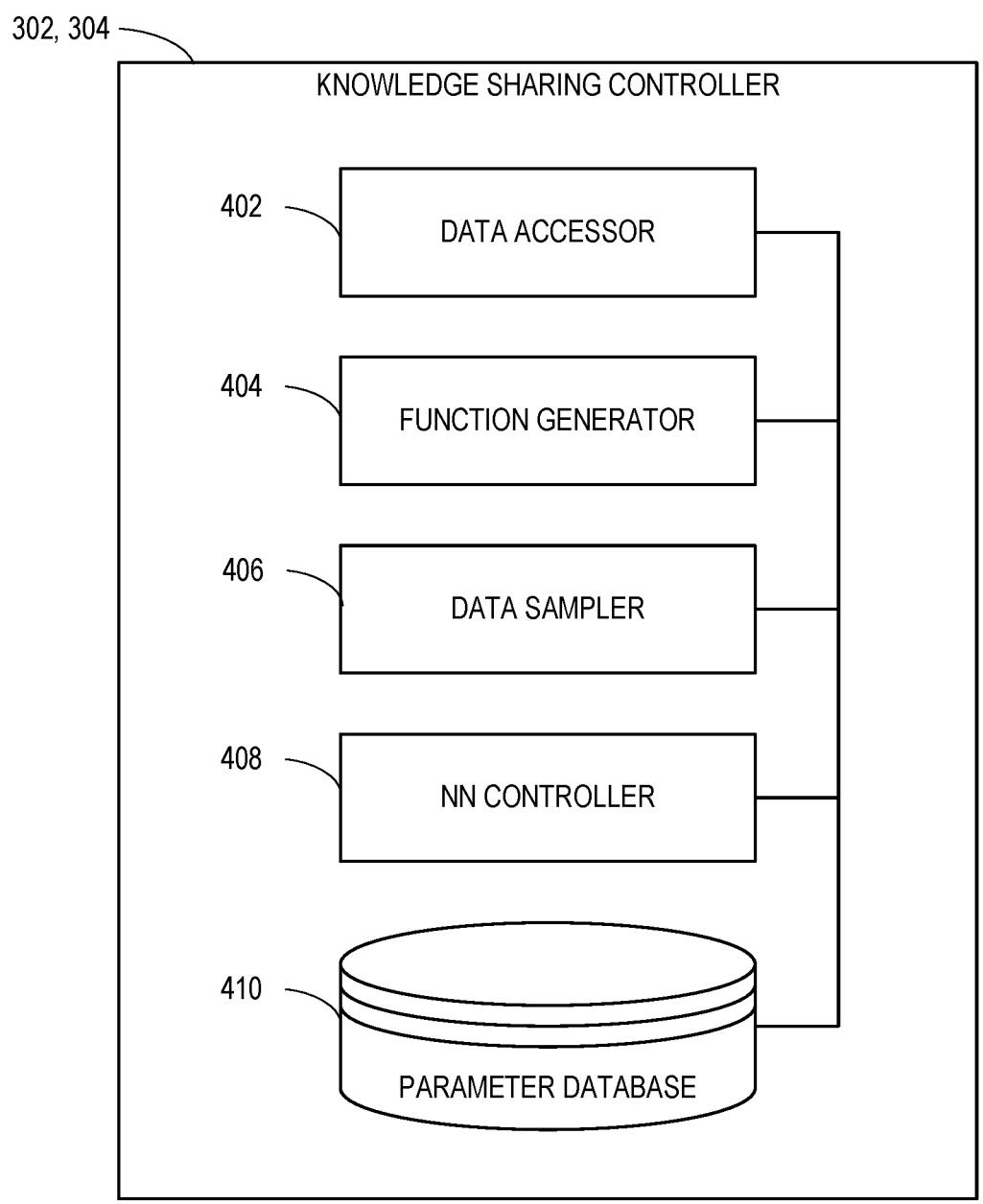
FIG. 4 is a schematic illustration of the example first knowledge sharing controller and/or the example second knowledge sharing controller of FIG. 3.

FIG. 4 is a schematic illustration of the example first knowledge sharing controller 302 and/or the example second knowledge sharing controller 304 of FIG. 3. The example knowledge sharing controllers 302, 304 include an example data accessor 402, an example function generator 404, an example data sampler 406, an example NN controller 408, and an example parameter database 410.

The example data accessor 402 accesses data stored in BNN systems. In some examples, the data accessor 402 implements means for accessing data. For example, the data accessor 402 obtains the parameters of the weight distribution of the first BNN system 202 and/or the parameters of the weight distribution of the second BNN system 204 of FIG. 2. Additionally or alternatively, the data accessor 402 obtains the mean and/or variance of BNNs. For example, the data accessor 402 obtains the mean and variance of the first BNN system 202 and the mean and variance of the second BNN system 204. In some examples, the data accessor 402 may access the data stored in the memory 108 of FIG. 1. In some examples, the data accessor 402 accesses the data stored in the first BNN system 202 and/or the second BNN system 204 in response to a query, on a manual basis, on a periodic basis, on a scheduled basis, etc.

The example function generator 404 generates a mixing function. In some examples, the function generator 404 implements means for generating a mixing function. For example, the function generator 404 generates a GMM and assigns a probability mass to the gaussian distributions of the BNN systems 202, 204. For example, the function generator 404 mixes the gaussians of each weight (e.g., the weight distributions of the first BNN system 202 and the second BNN system 204) such that all of the probability mass is assigned to only one of the gaussians in the mix.

The example data sampler 406 samples the probability distributions of the first BNN system 202 and/or the second BNN system 204. In some examples, the data sampler 406 implements means for sampling data. For example, the data sampler 406 samples a random variable of a categorical distribution that can be one of M number of possible categories representing the input networks (e.g., the number of BNN systems). In some examples, the data sampler 406 assigns a probability to each category (e.g., the BNN systems) such that the probability of each category is in the range of 0 to 1 and the probabilities of the categories sum to 1. For example, the data sampler 406 assigns the same probability mass to the distributions of the first BNN system 202 and the second BNN system 204 (e.g., uniformly weighted). That is, there is an equal probability of the data sampler 406 sampling the first BNN system 202 or the second BNN system 204. Additionally or alternatively, the data sampler 406 can assign probabilities to the categories based on statistics observed by each agent (e.g., the first BNN system 202 and the second BNN system 204). For example, the data sampler 406 can assign probabilities that are proportional to the number of classes observed by each agent. In some examples, the data sampler 406 generates parameters of a weight distribution based on the samples. For example, the data sampler 406 determines a weight distribution based on the sampled weight distributions of the first BNN system 202 and the second BNN system 204. In some examples, the data sampler 406 stores the weight distribution in the parameters database 410.

The example NN controller 408 trains a deterministic neural network (DNN). In some examples, the NN controller 408 implements means for training a neural network. For example, the NN controller 408 trains the DNN on a genetic algorithm. However, the NN controller 408 can use any other suitable training algorithm to train the DNN. The trained DNN generates a mean and variance based on input means and variances. That is, the NN controller 408 inputs means and variances into the DNN to generate a mean and variance. In some examples, the NN controller 408 stores the generated mean and variance in the parameters database 410. For example, the DNN receives as input the mean and variance of the first BNN system 202 and the mean and variance of the second BNN system 204. The DNN outputs a third mean and variance such that the third mean and the third variance define the probability distribution of the weight distribution of a third BNN.

The example parameter database 410 stores parameters of the generated weight distribution. For example, the parameter database 410 stores the weight distribution generated by the data sampler 406 and/or the NN controller 408. The example parameter database 410 of the illustrated example of FIG. 4 is implemented by any memory, storage device and/or storage disc for storing data such as, for example, flash memory, magnetic media, optical media, solid state memory, hard drive(s), thumb drive(s), etc. Furthermore, the data stored in the example parameter database 410 may be in any data format such as, for example, binary data, comma delimited data, tab delimited data, structured query language (SQL) structures, etc. While, in the illustrated example, the parameter database 410 is illustrated as a single device, the example parameter database 410 and/or any other data storage devices described herein may be implemented by any number and/or type(s) of memories.

Figure 5:
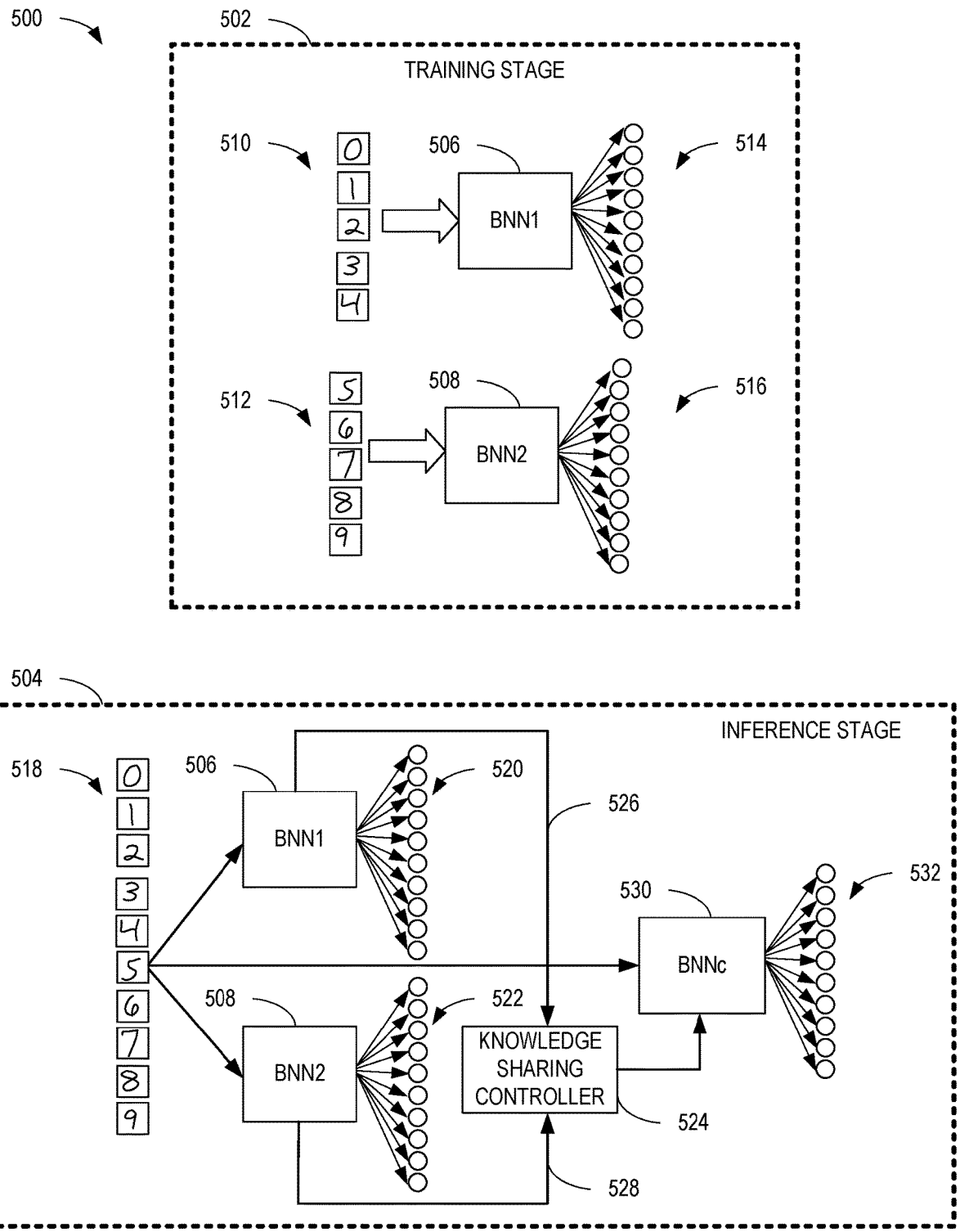
FIG. 5 is a schematic illustration of an example knowledge sharing system.

FIG. 5 is a schematic illustration of an example knowledge sharing system 500. The example knowledge sharing system 500 includes an example training stage 502 and an example inference stage 504. The example training stage 502 includes an example first BNN system 506 and an example second BNN system 508. In the illustrated example of FIG. 5, the first BNN system 506 and/or the second BNN system 508 may implement the example BNN 104 and/or the NN trainer 102 of FIG. 1. For example, the first BNN system 506 may implement the NN trainer 102 and the BNN 104 of FIG. 1. Likewise, the second BNN system 508 may implement the NN trainer 102 and the BNN 104 of FIG. 1, in an execution space separate from the first BNN system 506.

In the illustrated example of FIG. 5, the example first BNN system 506 accesses an example first dataset 510 and the example second BNN system 508 accesses an example second dataset 512. In the illustrated example of FIG. 5, the first dataset 510 and the second dataset 512 correspond to MNIST data. In some examples, the first dataset 510 and the second dataset 512 are incomplete. That is, the first dataset 510 corresponds to the classes 0-4 and the second dataset 512 corresponds to the classes 5-9. Additionally or alternatively, the first dataset 510 and the second dataset 512 correspond to partially overlapping datasets. For example, the first dataset 510 corresponds to the classes 0-6 and the second dataset 512 corresponds to the classes 4-9. The example first BNN system 506 trains on the first dataset 510 to generate an example first output 514 and the second BNN system 508 trains on the second dataset 512 to generate an example second output 516.

The example inference stage 504 includes the example first BNN system 506 and the example second BNN system 508. In the example inference stage 504, the first BNN system 506 and the second BNN system 508 access an example third dataset 518. In the illustrated example of FIG. 5, the third dataset 518 is a complete MNIST dataset. That is, the third dataset 518 includes the data of the first dataset 510 and the second dataset 512 (e.g., the classes 0-9). The first BNN system 506 accesses the third dataset 518 and generates an example third output 520. Likewise, the second BNN system 508 accesses the third dataset 518 and generates an example fourth output 522. However, because the first BNN system 506 and the second BNN system 508 were trained with incomplete datasets (e.g., the first dataset 510 and the second dataset 512, respectively), the third output 420 and the fourth output 422 have approximately 50% accuracy.

In the illustrated example of FIG. 5, the example inference stage 504 includes an example knowledge sharing controller 524. The example knowledge sharing controller 524 obtains an example first input 526 and an example second input 528. For example, the first input 526 corresponds to the weight distribution of the first BNN system 506 and the second input 528 corresponds to the weight distribution of the second BNN system 508. Additionally or alternatively, the first input 526 corresponds to a first mean and variance associated with the first BNN system 506 and the second input 528 corresponds to a second mean and variance associated with the second BNN system 508.

The knowledge sharing controller 524 determines a third weight distribution based on the first input 526 and the second input 528 to generate an example third BNN system 530. Thus, the weight distribution of the third BNN system 530 is based on data of the complete dataset (e.g., the first dataset 510 and the second dataset 512) without training on the third dataset 518. The third BNN system 530 accesses the third dataset 518 and generates an example fifth output 532. Because the weight distribution of the third BNN system 530 is based on the first input 526 and the second input 528, the fifth output 532 has a relatively higher accuracy than the third output 520 and/or the fourth output 522 (e.g., greater than 50% accuracy).

Figure 6:
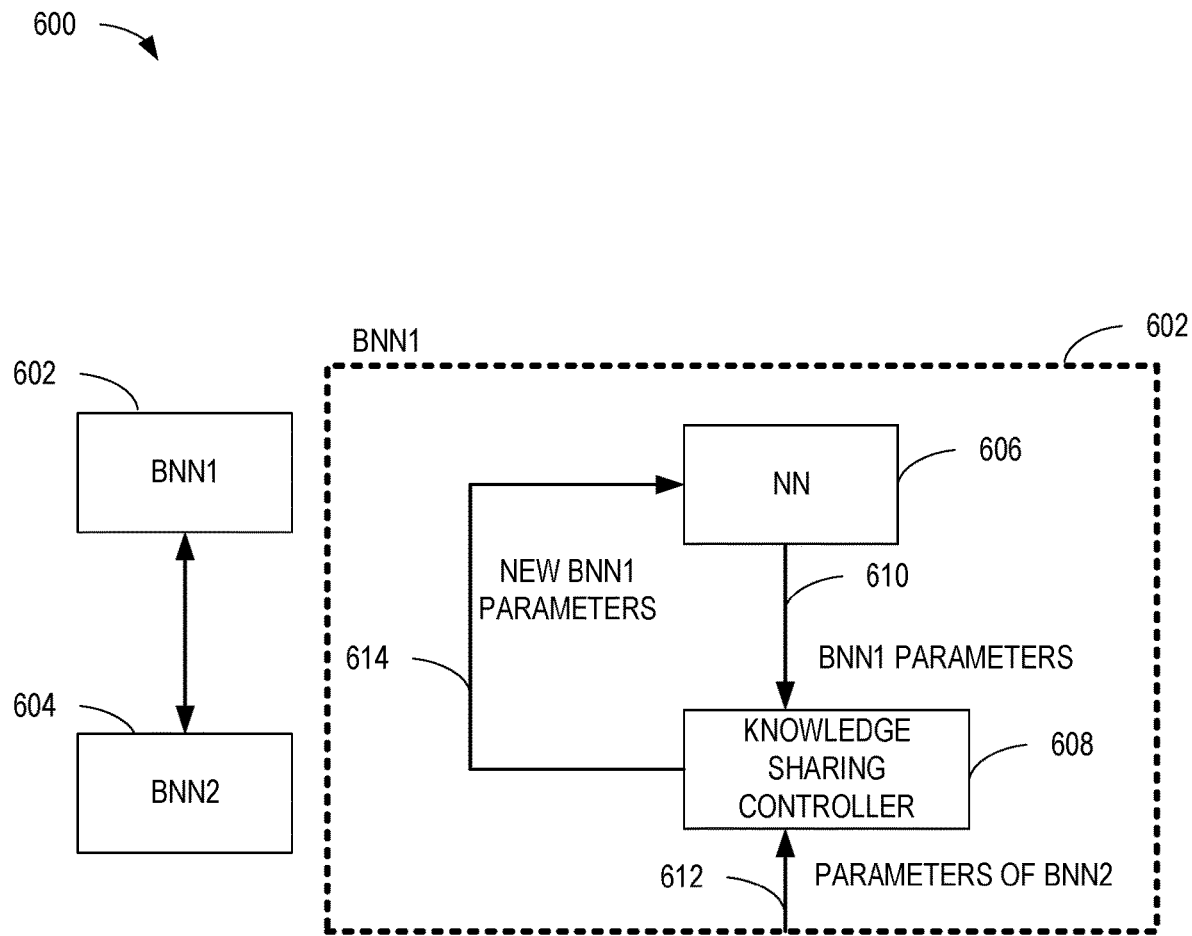
FIG. 6 is a schematic illustration of an example knowledge sharing system to implement a mixing function.

FIG. 6 is a schematic illustration of an example knowledge sharing system 600 to implement a mixing function. The example knowledge sharing system 600 includes an example first BNN system 602 and an example second BNN system 604. For example, the first BNN system 602 may implement the first BNN system 202 of FIG. 3 and the second BNN system 604 may implement the example second BNN system 204 of FIG. 3. The first BNN system 602 includes an example neural network 606 and an example knowledge sharing controller 608. In some examples, the neural network 606 is a BNN. For example, the neural network 606 may implement the example BNN 104 of FIG. 1 and the knowledge sharing controller 608 may implement the example first knowledge sharing controller 302 of FIG. 3.

The example neural network 606 generates an example first set of parameters 610. For example, the neural network 606 trains on a first subset of data (not illustrated) to generate the first set of parameters 610. The first BNN system 602 obtains an example second set of parameters 612. In the illustrated example of FIG. 6, the second set of parameters 612 are generated by the second BNN system 604. For example, the second BNN system 604 includes a second neural network (not illustrated) trained on a second subset of the data (not illustrated) to generate the second set of parameters 612.

The example knowledge sharing controller 608 obtains the first set of parameters 610 and the second set of parameters 612. However, the example knowledge sharing controller 608 can obtain any number of parameter sets. For example, the knowledge sharing controller 608 can obtain a third set of parameters corresponding to a third BNN system (not illustrated), a fourth set of parameters corresponding to a fourth BNN system (not illustrated), etc. The example knowledge sharing controller 608 implements a function for mixing the first set of parameters 610 and the second set of parameters 612. For example, the knowledge sharing controller 608 may derive a GMM and sample the GMM during inference. The example knowledge sharing controller 608 and mixing function are described in further detail below in connection with FIGS. 7-8.

The example knowledge sharing controller 608 generates an example third set of parameters 614. The third set of parameters 614 are based on the first set of parameters 610 and the second set of parameters 612. The example neural network 606 obtains the third set of parameters 614 and updates the first set of parameters 610. That is, the neural network 606 adjusts the weight distribution of the parameters (e.g., the first set of parameters 610) based on the third set of parameters 614. For example, the neural network 606 replaces the first set of parameters 610 with the third set of parameters 614. Thus, the updated weight distribution of the neural network 606 is based on the subset of data the second BNN system 604 trained on. In some examples, the neural network 606 stores the third set of parameters 614 (e.g., in the memory 108 of FIG. 1).

Figure 7:
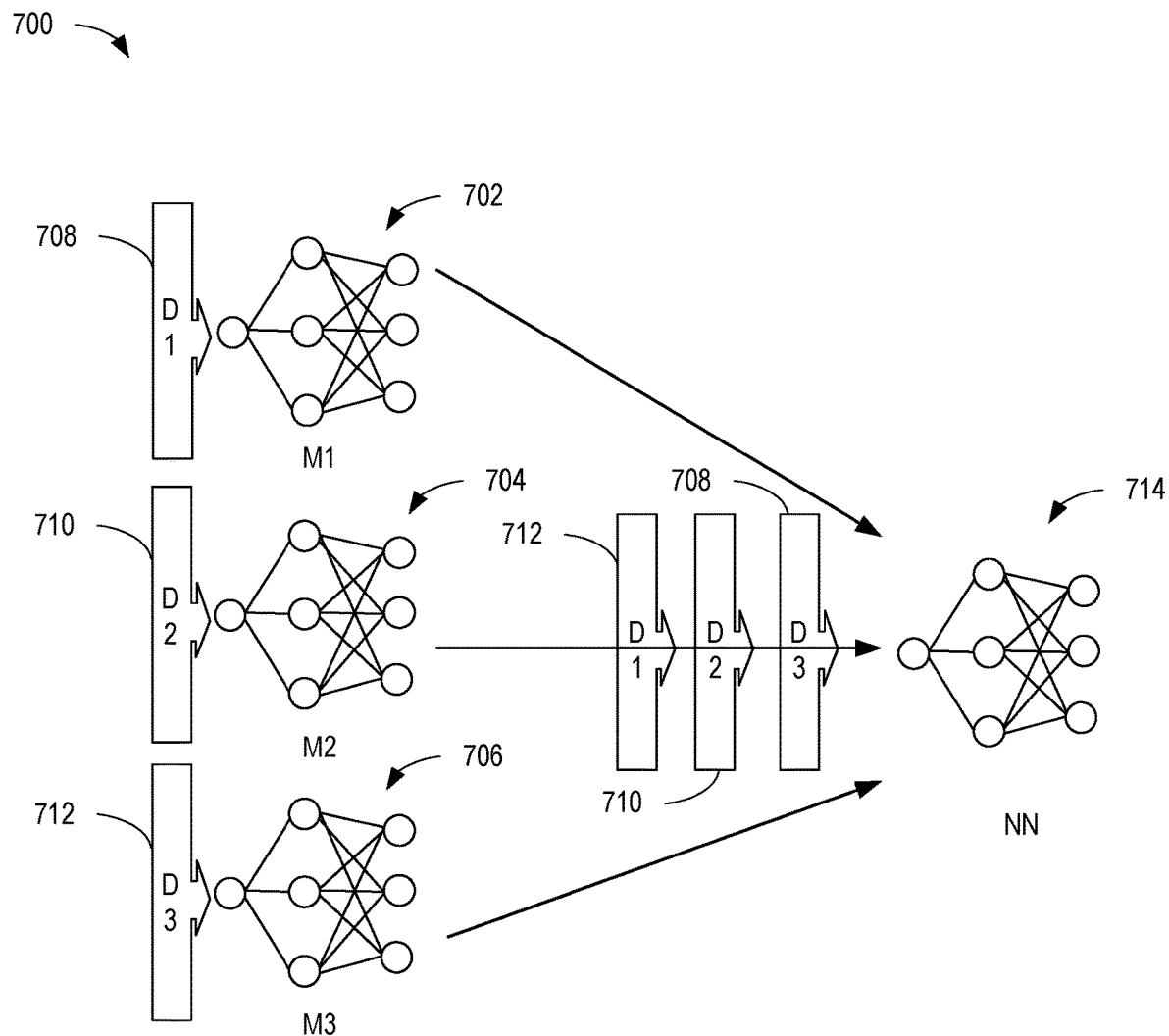
FIG. 7 is a schematic illustration of an example knowledge sharing architecture.

FIG. 7 is a schematic illustration of an example knowledge sharing architecture 700. The example knowledge sharing architecture 700 includes an example first neural network 702, an example second neural network 704, and an example third neural network 706. For example, the first neural network 702, the second neural network 704, and the third neural network 706 are BNNs. In the illustrated example of FIG. 7, the neural networks 702, 704, 706 access the same types of input(s), produce the same types of output(s), and have the same internal architecture(s). For example, the first neural network 702 is trained on an example first dataset 708, the second neural network 704 is trained on an example second dataset 710, and the third neural network 706 is trained on an example third dataset 712.

In examples disclosed herein, a knowledge sharing controller (e.g., the first knowledge sharing controller 302 and/or the second knowledge sharing controller 304 of FIG. 3, the knowledge sharing controller 424 of FIG. 4, the knowledge sharing controller 608 of FIG. 6, etc.) obtains the parameters of the weight distributions of the neural networks 702, 704, 706 to generate an example fourth neural network 714. In examples disclosed herein, the fourth neural network 714 is not retrained on the first dataset 708, the second dataset 710, and/or the third dataset 712. The example knowledge sharing controller combines the weights of the neural networks 702, 704, 706 for inference by the fourth neural network 714. For example, if the weights of the neural networks 702, 704, 706 are normal distributions, the fourth neural network 714 will be a GMM that is sampled during inference. Additionally or alternatively, the knowledge sharing controller instead uses the same BNN (e.g., the neural networks 702, 704, 706) and updates weights by mixing the weights of the neural networks 702, 704, 706. In such examples, the knowledge sharing controller does not generate the fourth neural network 714.

In the illustrated example of FIG. 7, the fourth neural network 714 encompasses the knowledge acquired by the neural networks 702, 704, 706 to infer from the datasets 708, 710, 712. For example, the accuracy of the neural networks 702, 704, 706 inferring from the first dataset 708, second dataset 710, and the third dataset 712 is at most 33%. However, because the fourth neural network 714 incorporates the parameters of the weight distributions of the neural networks 702, 704, 706, the accuracy of the fourth neural network 714 inferring from the first dataset 708, the second dataset 710, and/or the third dataset 712 is relatively higher than the accuracy of the neural networks 702, 704, 706.

Figure 8:
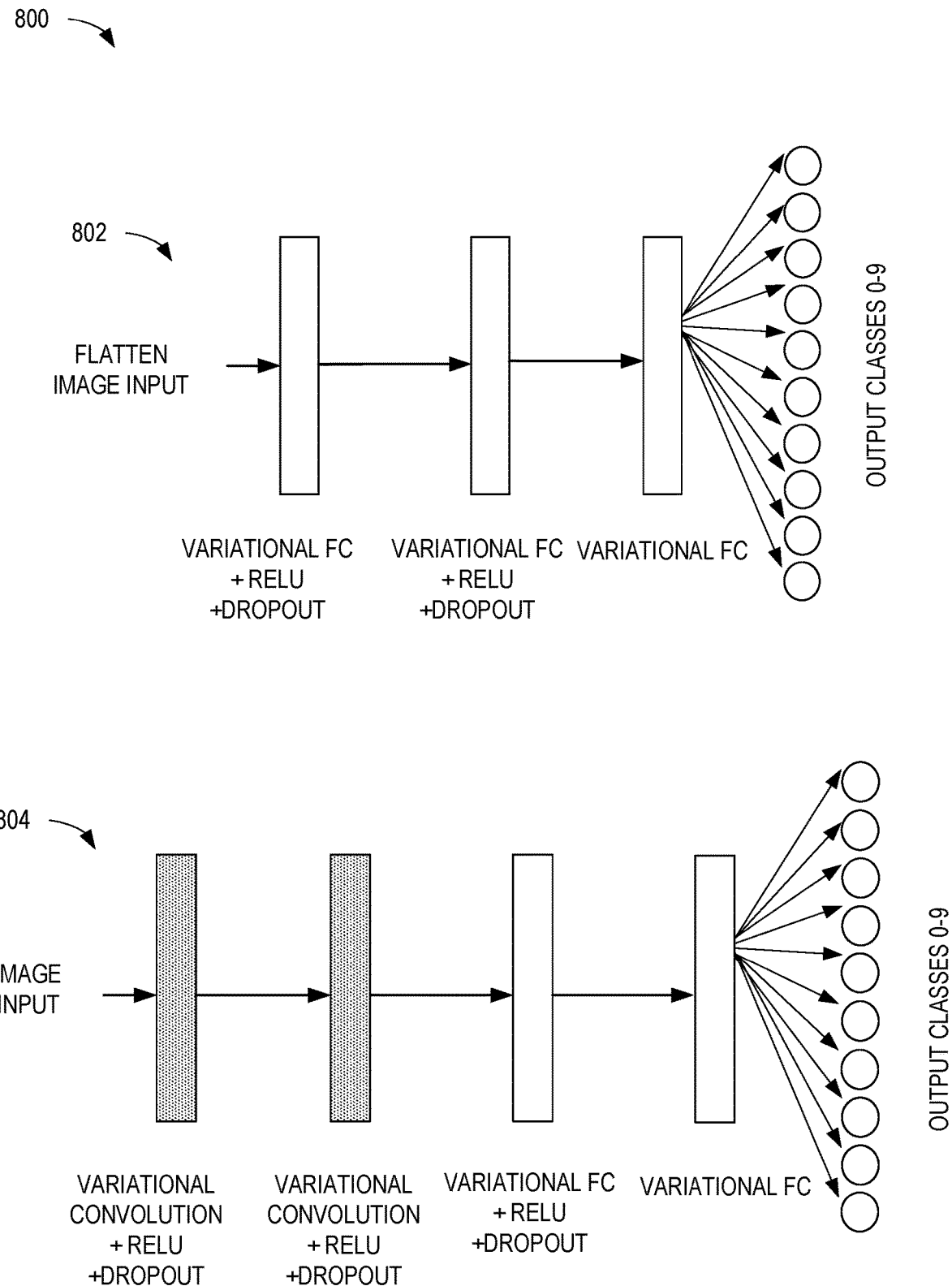
FIG. 8 is a schematic illustration of an example knowledge sharing architecture of an example first BNN and an example second BNN.

FIG. 8 is a schematic illustration of an example knowledge sharing architecture 800 of an example first BNN 802 and an example second BNN 804. In the illustrated example of FIG. 8, the architecture of the first BNN 802 is fully connected and the architecture of the second BNN 804 is convolutional. In the example described above, a first BNN and a second BNN (not illustrated) are trained on incomplete datasets. In some examples, the first BNN and the second BNN are fully connected (e.g., implement the first BNN 802). In some examples, the first BNN and the second BNN are convolutional (e.g., implement the second BNN 804). For example, using MNIST data, the first BNN is trained using data from the 0-4 classes and the second BNN is trained using data from the 5-9 classes. In examples disclosed herein, a knowledge sharing controller generates a third BNN based on the weight distributions of the first and second BNNs. Table 1 illustrates the approximate accuracies of the output of the first, second, and third BNNs using the complete dataset (e.g., classes 0-9).

TABLE 1

| Architecture | BNN1 | BNN2 | BNN3 |
|---|---|---|---|
| Fully Connected BNN | 47.86 | 51.10 | 71.68 |
| Convolution BNN | 48.26 | 51.23 | 87.37 |

In the illustrated example of Table 1, the first BNN and the second BNN for both the fully connected architecture and the convolution architecture have approximately 50% accuracy when inferring on the complete dataset. In contrast, the third BNN has a relatively higher accuracy when inferring on the complete dataset with respect to the first and second BNN.

Figure 9:
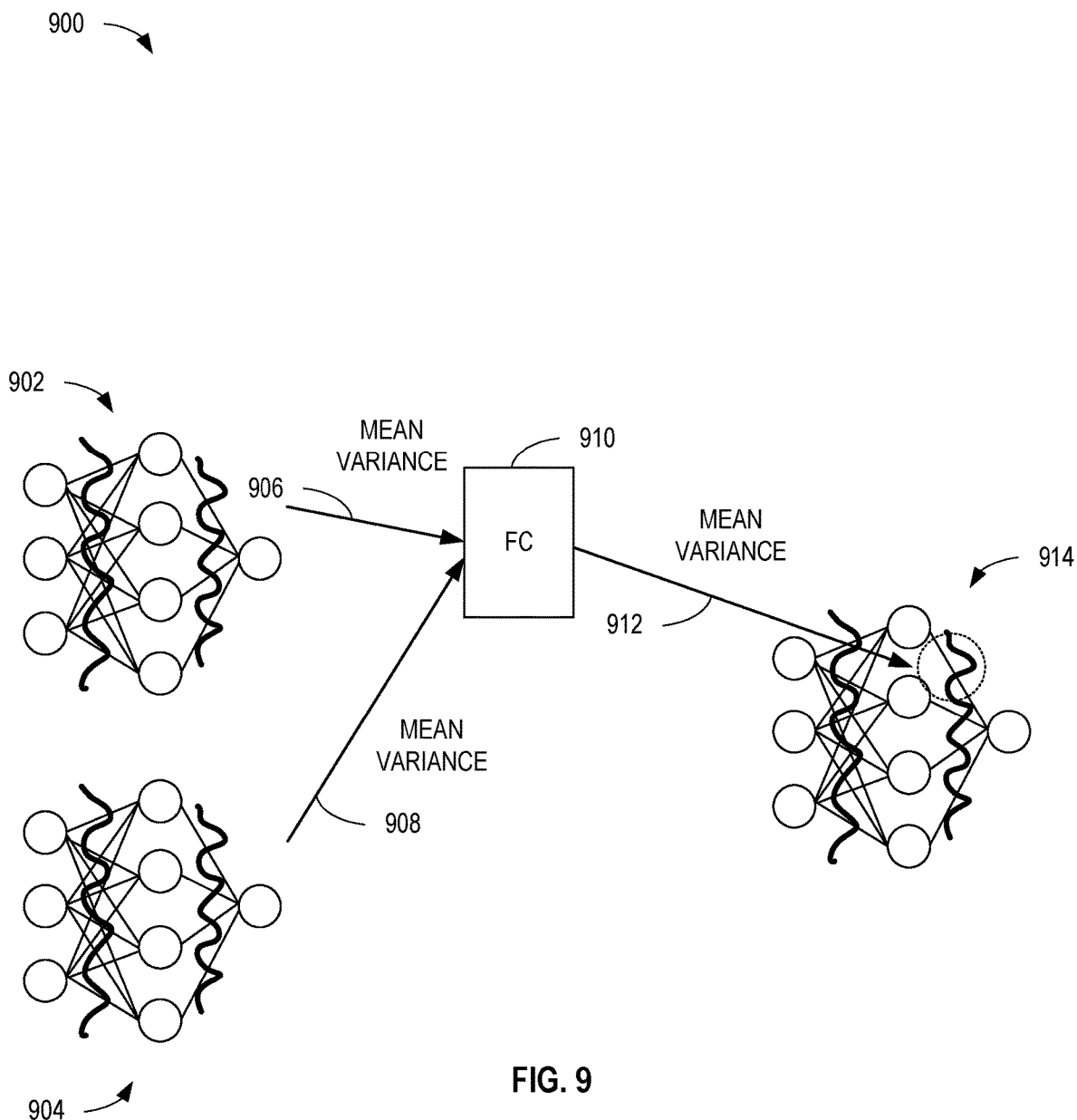
FIG. 9 is a schematic illustration of an example knowledge sharing system to implement a deep neural network.

FIG. 9 is a schematic illustration of an example knowledge sharing system 900. The example knowledge sharing system 900 includes an example first BNN 902 and an example second BNN 904. In some examples, the first BNN 902 trains on a first dataset and the second BNN 904 trains on a second dataset. For example, the dataset can be MNIST data, and the first dataset can be the classes 0-4 and the second dataset can be the classes 5-9. The first BNN 902 generates an example first output 906 and the second BNN 904 generates an example second output 908. In the illustrated example of FIG. 9, the first output 906 is a first mean and a first variance. For example, the first mean and the first variance define the probability distribution of the weight distribution of the first BNN 902. Similarly, the second output 908 is a second mean and a second variance. For example, the second mean and the second variance define the probability distribution of the weight distribution of the second BNN 904.

The example knowledge sharing system 900 includes an example knowledge sharing controller 910. In the illustrated example of FIG. 9, the knowledge sharing controller 910 is a DNN. The example knowledge sharing controller 910 obtains the first output 906 and the second output 908. That is, the knowledge sharing controller 910 obtains four inputs (e.g., the first mean, the first variance, the second mean, and the second variance). The example knowledge sharing controller 910 generates an example third output 912 based on the four inputs. For example, the third output 912 includes a third mean and a third variance. In the illustrated example of FIG. 9, the knowledge sharing controller 910 generates an example third BNN 914 based on the third output 912. For example, the third mean and the third variance define the probability distribution of the weight distribution of the third BNN 914.

In contrast with the first knowledge sharing system (e.g., knowledge sharing system 600 of FIG. 6, the knowledge sharing architecture 700 of FIG. 7, and/or the knowledge sharing architecture 800 of FIG. 8), the weight distribution of the first BNN 902 and the second BNN 904 do not change during inference. That is, the DNN of the knowledge sharing controller 910 serves as a mapping of the first mean and variance and the second mean and variance to determine the third mean and variance. Additionally or alternatively, the knowledge sharing controller 910 generates the example third BNN 914. In some examples, the weight distributions of the third BNN 914 are Gaussian distributions. In some examples, the knowledge sharing controller 910 uses the same DNN for all weights on both networks (e.g., the first BNN 902 and the second BNN 904).

In some examples, the dataset of the knowledge sharing system 900 is MNIST data and the NN trainer 102 of FIG. 1 trains the first BNN 902 using data from the 0-4 classes. The NN trainer 102 trains the second BNN 904 using data from the 5-9 classes. As described above, the outputs of the BNNs 902, 904 during inference on the complete dataset (e.g., data from the 0-9 classes) have approximately 50% accuracy.

The example knowledge sharing controller 910 is trained to determine the third output 912 (e.g., the third mean and the third variance). In some examples, the knowledge sharing controller 910 may be trained using any machine learning training approach including, for example, a genetic algorithm. For example, the knowledge sharing controller 910 generates an initial population (e.g., determine multiple different fully connected weights). The example knowledge sharing controller 910 generates the third BNN 914 to evaluate the fully connected weights of the initial population and serves as the fitness function. The knowledge sharing controller 910 applies crossover and/or mutation to the initial population to generate a second generation. The knowledge sharing controller 910 determines an observed fitness of the second generation and compares the observed fitness to a fitness threshold. For example, the fitness threshold can be 55%, 60%, etc. If the observed fitness does not satisfy the fitness threshold, the knowledge sharing controller 910 generates an additional generation (e.g., a third generation, a fourth generation, etc.). In some examples, the knowledge sharing controller 910 generates an additional generation if the observed fitness is less than the fitness threshold, a threshold number of generations has been generated, etc.

In some examples, the third BNN 914 has a validation of 50%. For example, the knowledge sharing controller 910 may learn to discard weights from the first BNN 902 and keep weights from the second BNN 904. Thus, the fitness function can be modified to define a relatively higher importance to a higher validation accuracy (e.g., a validation accuracy greater than the fitness threshold) and to the output of the mean and variance of the knowledge sharing controller 910. For example, the fitness can be defined by example Equation 1.

$$\text{fitness} = \text{accuracy} + \alpha(\beta(\mu_3, \sigma_3, \mu_1, \sigma_1) + \beta(\mu_3, \sigma_3, \mu_2, \sigma_2)) \quad \text{Equation 1}$$

In equation 1, $\alpha$ is the hyperparameter and $\beta(\mu_3, \sigma_3, \mu_1, \sigma_1)$ is the Hellinger distance between the input distribution (e.g., $\mu_1, \sigma_1, \mu_2, \sigma_2$) and the output distribution (e.g., $\mu_3, \sigma_3$). For example, $\mu$ is the mean of the weight distribution and $\sigma$ is the variance of the weight distribution. That is, the term $\beta(\mu_3, \sigma_3, \mu_1, \sigma_1)$ determines a difference between the input and output probability density function (PDF) of the knowledge sharing controller 910. However, the knowledge sharing controller 910 may use any other suitable technique to determine fitness. In some examples, the accuracy of the third BNN 914 increases to 67.02% after 26 generations.

While an example manner of implementing the first knowledge sharing controller 302 and/or the second knowledge sharing controller 304 of FIG. 3 is illustrated in FIG.

4, one or more of the elements, processes and/or devices illustrated in FIG. 4 may be combined, divided, re-arranged, omitted, eliminated and/or implemented in any other way. Further, the example data accessor 402, the example function generator 404, the example data sampler 406, the example NN controller 408, the example parameter database 410 and/or, more generally, the example first knowledge sharing controller 302 and/or the example second knowledge sharing controller 304 of FIG. 3 may be implemented by hardware, software, firmware and/or any combination of hardware, software and/or firmware. Thus, for example, any of the example data accessor 402, the example function generator 404, the example data sampler 406, the example NN controller 408, the example parameter database 410 and/or, more generally, the example first knowledge sharing controller 302 and/or the example second knowledge sharing controller 304 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, data accessor 402, the example function generator 404, the example data sampler 406, the example NN controller 408, and/or the example parameter database 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example first knowledge sharing controller 302 and/or the example second knowledge sharing controller 304 of FIG. 3 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
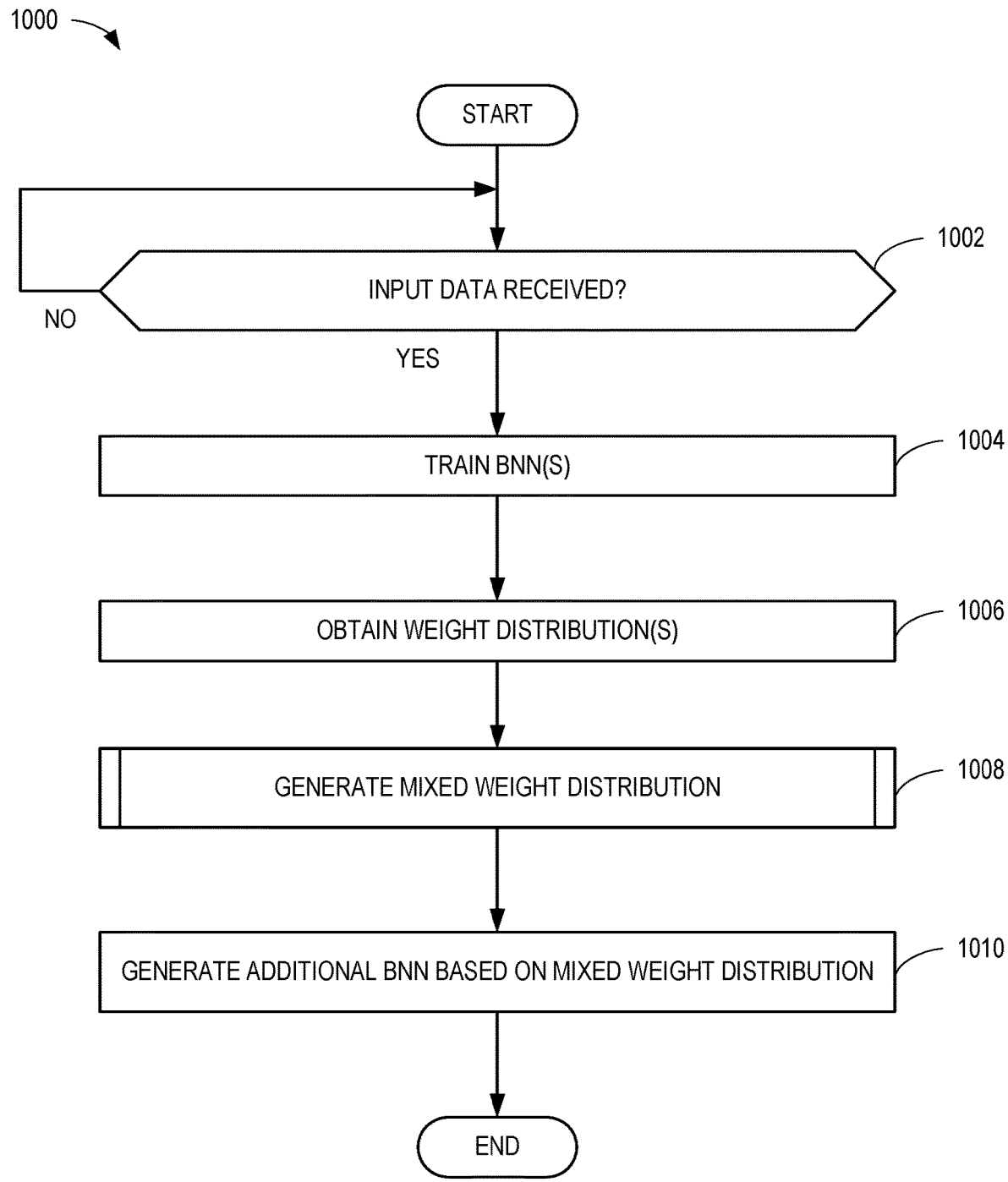
FIG. 10 is a flowchart representative of example machine readable instructions which may be executed to implement the example knowledge sharing controller of FIG. 4 to facilitate knowledge sharing.
Figure 11:
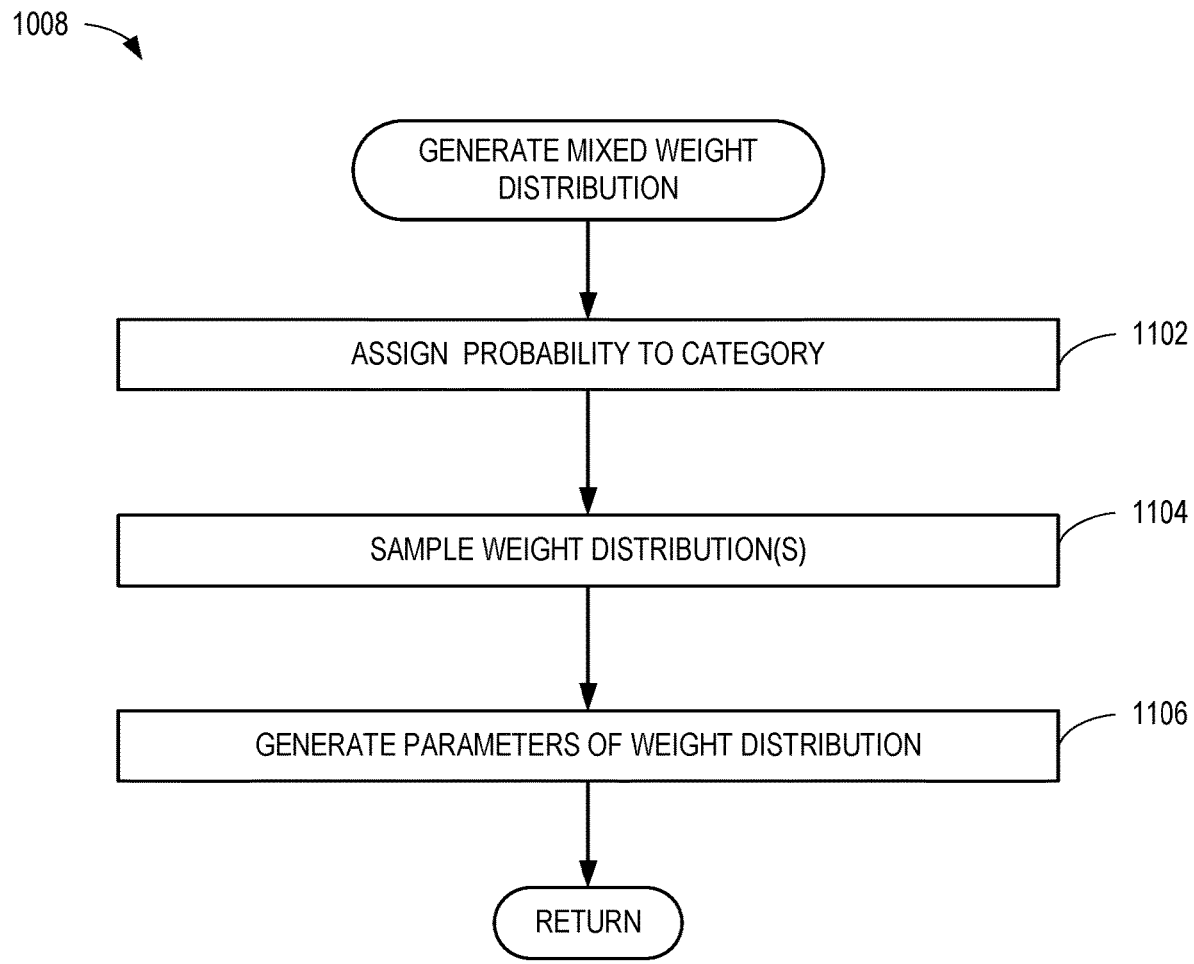
FIG. 11 is a flowchart representative of example machine readable instructions which may be executed to implement the example knowledge sharing controller of FIG. 4 to mix weight distributions.
Figure 12:
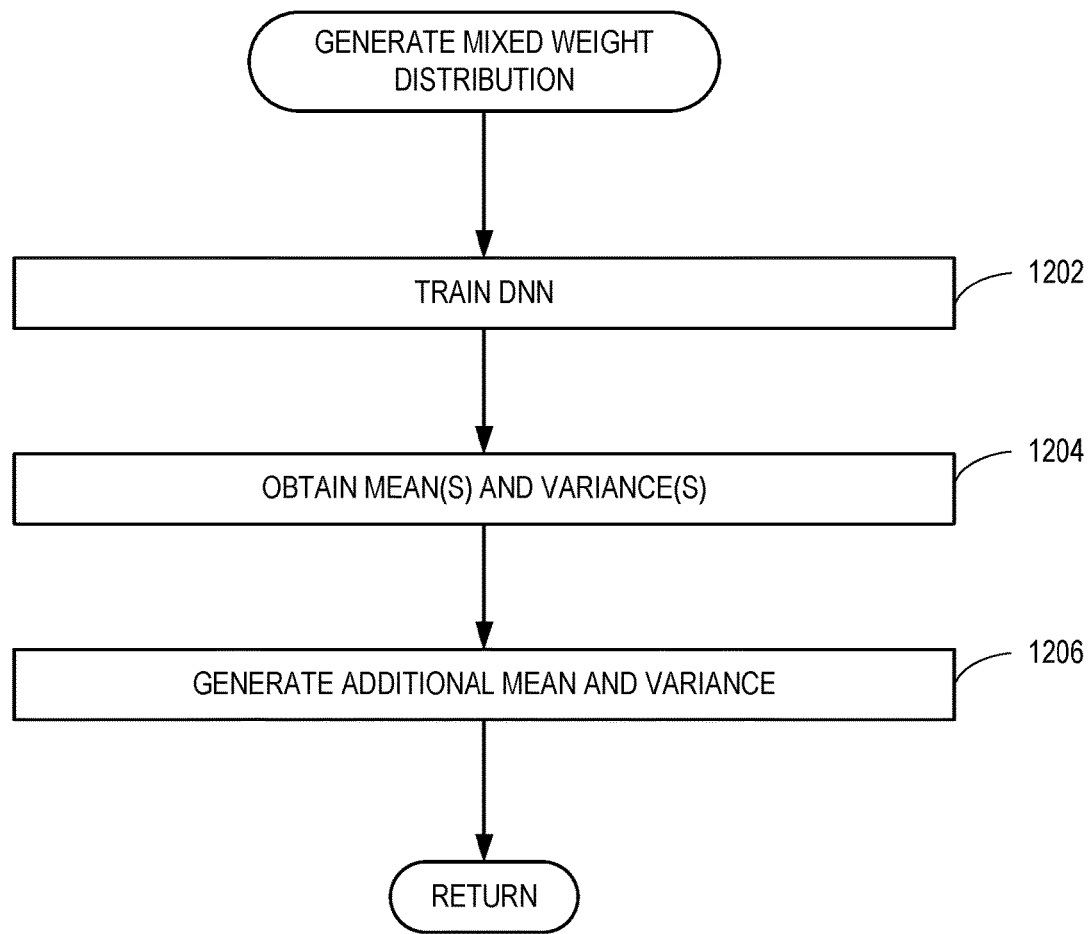
FIG. 12 is a flowchart representative of example machine readable instructions which may be executed to implement an example neural network controller of FIG. 4 to train a deep neural network for knowledge sharing.

Flowcharts representative of example hardware logic, machine readable instructions, hardware implemented state machines, and/or any combination thereof for implementing the first knowledge sharing controller 302 and/or the second knowledge sharing controller 304 of FIG. 3 are shown in FIG. 10-12. The machine readable instructions may be one or more executable programs or portion(s) of an executable program for execution by a computer processor and/or processor circuitry, such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIG. 10-12, many other methods of implementing the example first knowledge sharing controller 302 and/or the example second knowledge sharing controller 304 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIGS. 10-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 10 is a flowchart representative of example machine-readable instructions 1000 that may be executed to implement the example first knowledge sharing controller 302 and/or the example second knowledge sharing controller 304 of FIGS. 3 and/or 4 to facilitate knowledge sharing. Although the instructions 1000 are described in conjunction with the example first BNN system 202 of FIG. 2, the instructions 1000 may be described in conjunction with any BNN system in any type of neural network that includes a knowledge sharing controller.

The example machine-readable instructions of FIG. 10 begin at block 1002 at which the example NN trainer 102 (FIG. 1) determines if input data was received. For example, the NN trainer 102 determines if training data (e.g., MNIST data, etc.) was received. If the example NN trainer 102 determines training data was not received (e.g., block 1002 returns a result of NO), instructions return to block 1002. If the example NN trainer 102 determines that input data was received (e.g., block 1002 returns a result of YES), the example NN trainer 102 trains BNN(s). (Block 1004). For example, the NN trainer 102 trains the first BNN system 202 on the first dataset 210 (FIG. 2). Similarly, the NN trainer 102 may train the second BNN system 204 (FIG. 2) on the second dataset 212 (FIG. 2).

The example data accessor 402 obtains weight distribution(s). (Block 1006). For example, the data accessor 402 obtains the weight distributions of the first BNN system 202 and the second BNN system 204. The example first knowledge sharing controller 302 generates a mixed weight distribution. (Block 1008). For example, the first knowledge sharing controller 302 implements a mixing function to mix the first weight distribution of the first BNN system 202 and the second BNN system 204. The mixing function is described in further detail below in connection with FIG. 11. Additionally or alternatively, the first knowledge sharing controller 302 trains a DNN to generate a mean and variance based on input mean(s) and variance(s). The DNN is described in further detail below in connection with FIG. 12.

The example first knowledge sharing controller 302 generates an additional BNN based on the mixed weight distribution. (Block 1010). For example, the first knowledge sharing controller 302 generates an additional BNN based on the mixed weight distribution determined by the data sampler 406 (FIG. 4). Additionally or alternatively, the first knowledge sharing controller 302 generates an additional BNN based on the generated mean and variance determined by the DNN.

FIG. 11 is a flowchart representative of example machine-readable instructions 1100 that may be executed to implement the example first knowledge sharing controller 302 and/or the example knowledge sharing controller 304 of FIGS. 3 and/or 4 to mix weight distributions. The example function generator 404 assigns a probability to categories. (Block 1102). For example, the function generator 404 (FIG. 4) determines to assign uniform probabilities to each BNN, probabilities proportional to the classes observed by each BNN, etc.

The example data sampler 406 (FIG. 4) samples weight distribution(s) of the BNNs. (Block 1104). For example, the data sampler 406 generates a random value between 0 and 1 and samples the BNN corresponding to the random value. The example data sampler 406 generates parameters of an additional weight distribution based on the sampled weight distribution(s). (Block 1106). Control returns to block 1010 of the instructions 1000 of FIG. 10.

FIG. 12 is a flowchart representative of example machine-readable instructions 1200 that may be executed to implement the example NN controller 408 of FIG. 4 to train a DNN for knowledge sharing. The example NN controller 408 trains a DNN. (Block 1202). For example, the NN controller 408 trains the DNN using a genetic algorithm. The example NN controller 408 obtains mean(s) and variance(s). (Block 1204). For example, the NN controller 408 obtains the means and variances of the ensemble of BNNs. The example NN controller 408 generates an additional mean and variance. (Block 1206). For example, the NN controller 408 inputs the means and variances of the ensemble of BNNs into the trained DNN. The DNN generates the additional mean and variance. Control returns to block 1010 of the instructions 1000 of FIG. 10.

Figure 13:
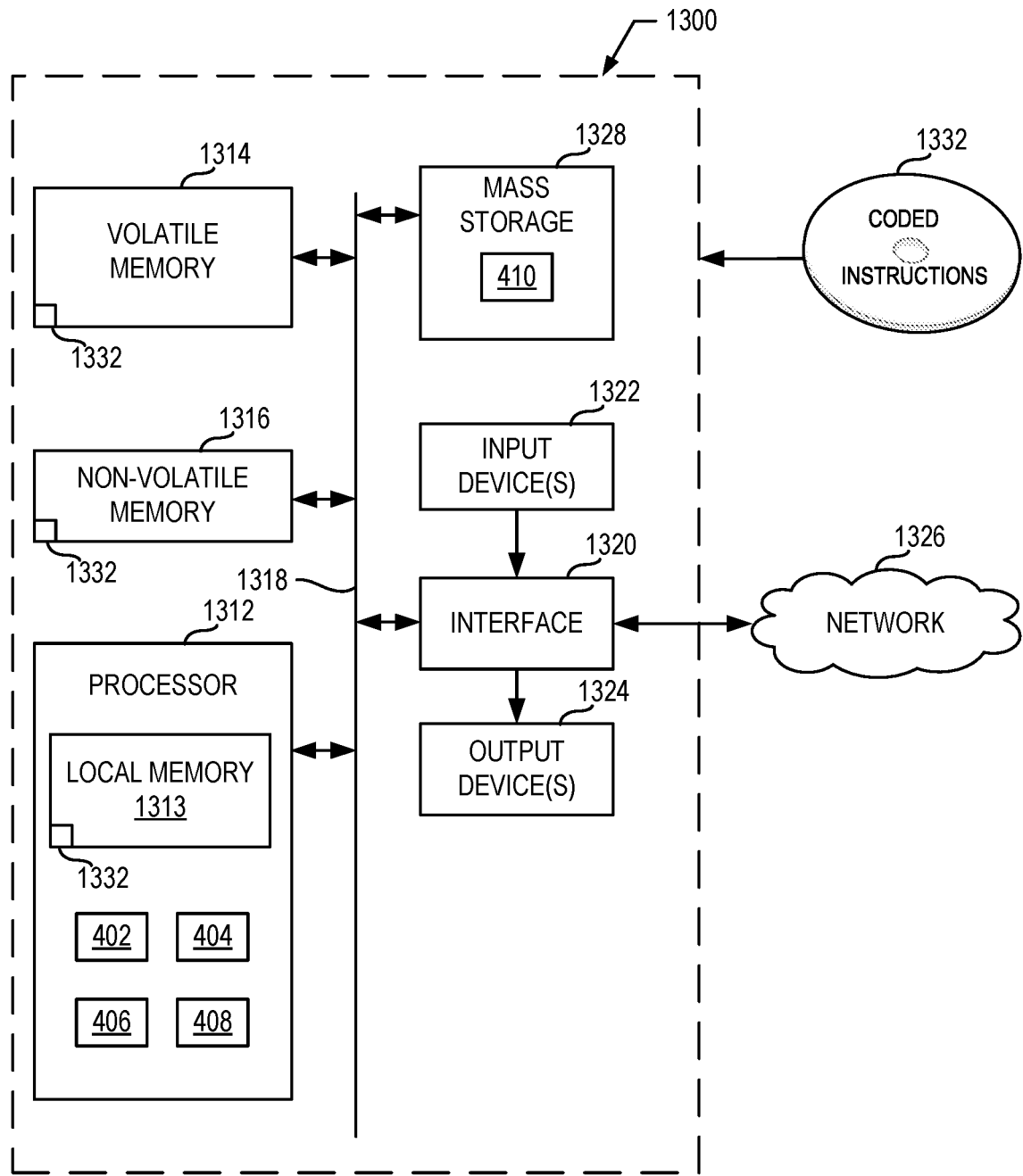
FIG. 13 is a block diagram of an example processing platform structured to execute the instructions of FIGS. 10-12 to implement the example knowledge sharing controller.

FIG. 13 is a block diagram of an example processor platform 1300 structured to execute the instructions of FIGS. 10-12 to implement the example first knowledge sharing controller 302 and/or the example second knowledge sharing controller 304 of FIG. 3. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data accessor 402, the example function generator 404, the example data sampler 406, and the example NN controller 408.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIGS. 10-12 may be stored in the mass storage device 1328, in the volatile memory 1314, in the non-volatile memory 1316, and/or on a removable non-transitory computer readable storage medium such as a CD or DVD.

Figure 14:
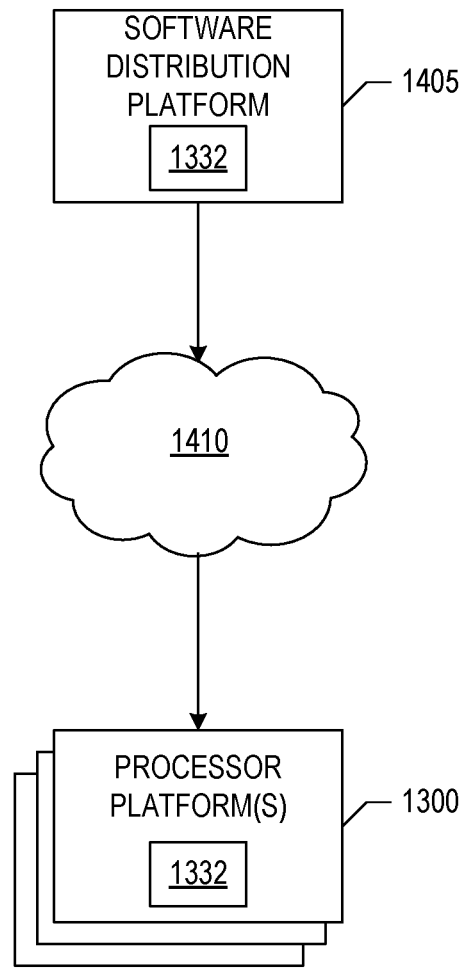
FIG. 14 is a block diagram of an example software distribution platform to distribute software (e.g., software corresponding to the example computer readable instructions of FIGS. 10-12) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1405 to distribute software such as the example computer readable instructions 1332 of FIG. 13 to third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1332 of FIG. 13. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the computer readable instructions 1332, which may correspond to the example computer readable instructions 1332 of FIGS. 10-12 as described above. The one or more servers of the example software distribution platform 1405 are in communication with a network 1410, which may correspond to any one or more of the Internet and/or any of the example networks 1336 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1332 from the software distribution platform 1405. For example, the software, which may correspond to the example computer readable instructions 1000 of FIG. 10, may be downloaded to the example processor platform 1300, which is to execute the computer readable instructions 1332 to implement the example first knowledge sharing controller 302 and/or the example second knowledge sharing controller 304. In some example, one or more servers of the software distribution platform 1405 periodically offer, transmit, and/or force updates to the software (e.g., the example computer readable instructions 1332 of FIG. 13) to ensure improvements, patches, updates, etc. are distributed and applied to the software at the end user devices.

From the foregoing, it will be appreciated that example methods, apparatus and articles of manufacture have been disclosed that facilitate efficient knowledge sharing among neural networks. For example, a knowledge sharing controller obtains weight distributions and/or means and variances of weight distributions of Bayesian neural networks trained on incomplete datasets. The example knowledge sharing controller mixes the obtained weight distributions and/or means and variances to generate an additional Bayesian neural network. The additional Bayesian neural network is associated with a relatively higher accuracy during inference than the initially trained Bayesian neural networks. The disclosed methods, apparatus and articles of manufacture improve the efficiency of using a computing device by reducing memory (e.g., prior training data is not stored) and computing time (e.g., the additional BNN is not re-trained on the complete dataset). The disclosed methods, apparatus and articles of manufacture are accordingly directed to one or more improvement(s) in the functioning of a computer.

Example methods, apparatus, systems, and articles of manufacture to facilitate efficient knowledge sharing among neural networks are disclosed herein. Further examples and combinations thereof include the following:

Example 1 includes an apparatus to facilitate knowledge sharing among neural networks, the apparatus comprising a trainer to train, at a first computing system, a first Bayesian neural network (BNN) on a first subset of training data to generate a first weight distribution, and train, at a second computing system, a second BNN on a second subset of the training data to generate a second weight distribution, the second subset of the training data different from the first subset of training data, and a knowledge sharing controller to generate a third BNN based on the first weight distribution and the second weight distribution.

Example 2 includes the apparatus of example 1, wherein the first subset of the training data and the second subset of the training data are mutually exclusive.

Example 3 includes the apparatus of example 1, wherein the knowledge sharing controller is a first knowledge sharing controller associated with the first BNN, and further including a second knowledge sharing controller associated with the second BNN.

Example 4 includes the apparatus of example 3, wherein the first knowledge sharing controller is to mix the second weight distribution with the first weight distribution and the second knowledge sharing controller is to mix the first weight distribution with the second weight distribution.

Example 5 includes the apparatus of example 3, wherein the first knowledge sharing controller and the second knowledge sharing controller are a Gaussian Mixture Model.

Example 6 includes the apparatus of example 1, wherein the knowledge sharing controller is implemented using a deterministic neural network.

Example 7 includes the apparatus of example 6, wherein the knowledge sharing controller is to access a first mean and a first variance associated with the first BNN, and a second mean and a second variance associated with the second BNN.

Example 8 includes the apparatus of example 7, wherein the knowledge sharing controller is to generate a third mean and a third variance associated with the third BNN.

Example 9 includes the apparatus of example 8, wherein the third BNN is associated with a third weight distribution, the third weight distribution having weights represented as Gaussian distributions.

Example 10 includes at least one non-transitory computer readable medium comprising instructions that, when executed, cause at least one processor to at least train, at a first computing system, a first Bayesian neural network (BNN) on a first subset of training data to generate a first weight distribution, train, at a second computing system, a second BNN on a second subset of the training data to generate a second weight distribution, the second subset of the training data different from the first subset of training data, and generate a third BNN based on the first weight distribution and the second weight distribution.

Example 11 includes the at least one non-transitory computer readable medium of example 10, wherein the first subset of the training data and the second subset of the training data are mutually exclusive.

Example 12 includes the at least one non-transitory computer readable medium of example 10, wherein the at least one processor is a first processor associated with the first BNN, and further including a second processor associated with the second BNN.

Example 13 includes the at least one non-transitory computer readable medium of example 12, wherein the instructions, when executed, cause the first processor to mix the second weight distribution with the first weight distribution and the second processor to mix the first weight distribution with the second weight distribution.

Example 14 includes the at least one non-transitory computer readable medium of example 12, wherein the first processor and the second processor are implemented using a Gaussian Mixture Model.

Example 15 includes the at least one non-transitory computer readable medium of example 10, wherein the at least one processor is implemented using a deterministic neural network.

Example 16 includes the at least one non-transitory computer readable medium of example 15, wherein the instructions, when executed, cause the at least one processor to access a first mean and a first variance associated with the first BNN, and a second mean and a second variance associated with the second BNN.

Example 17 includes the at least one non-transitory computer readable medium of example 16, wherein the instructions, when executed, cause the at least one processor to generate a third mean and a third variance associated with the third BNN.

Example 18 includes the at least one non-transitory computer readable medium of example 17, wherein the third BNN is associated with a third weight distribution, the third weight distribution having weights represented as Gaussian distributions.

Example 19 includes an apparatus to facilitate knowledge sharing among neural networks, the apparatus comprising at least one storage device, and at least one processor to train, at a first computing system, a first Bayesian neural network (BNN) on a first subset of training data to generate a first weight distribution, train, at a second computing system, a second BNN on a second subset of the training data to generate a second weight distribution, the second subset of the training data different from the first subset of training data, and generate a third BNN based on the first weight distribution and the second weight distribution.

Example 20 includes the apparatus of example 19, wherein the first subset of the training data and the second subset of the training data are mutually exclusive.

Example 21 includes the apparatus of example 19, wherein the at least one processor is a first processor associated with the first BNN, and further including a second processor associated with the second BNN.

Example 22 includes the apparatus of example 21, wherein the first processor is to mix the second weight distribution with the first weight distribution and the second processor is to mix the first weight distribution with the second weight distribution.

Example 23 includes the apparatus of example 21, wherein the first processor and the second processor are a Gaussian Mixture Model.

Example 24 includes the apparatus of example 19, wherein the at least one processor is implemented using a deterministic neural network.

Example 25 includes the apparatus of example 24, wherein the at least one processor is to access a first mean and a first variance associated with the first BNN, and a second mean and a second variance associated with the second BNN.

Example 26 includes the apparatus of example 25, wherein the at least one processor is to generate a third mean and a third variance associated with the third BNN.

Example 27 includes the apparatus of example 26, wherein the third BNN is associated with a third weight distribution, the third weight distribution having weights represented as Gaussian distributions.

Example 28 includes a method to facilitate knowledge sharing among neural networks, the method comprising training, at a first computing system, a first Bayesian neural network (BNN) on a first subset of training data to generate a first weight distribution, training, at a second computing system, a second BNN on a second subset of the training data to generate a second weight distribution, the second subset of the training data different from the first subset of training data, and generating a third BNN based on the first weight distribution and the second weight distribution.

Example 29 includes the method of example 28, wherein the first subset of the training data and the second subset of the training data are mutually exclusive.

Example 30 includes the method of example 28, further including mixing the second weight distribution with the first weight distribution, and mixing the first weight distribution with the second weight distribution.

Example 31 includes the method of example 30, wherein the third BNN is generated using a Gaussian Mixture Model.

Example 32 includes the method of example 28, wherein the third BNN is generated using a deterministic neural network.

Example 33 includes the method of example 32, further including accessing a first mean and a first variance associated with the first BNN, and a second mean and a second variance associated with the second BNN.

Example 34 includes the method of example 33, further including generating a third mean and a third variance associated with the third BNN.

Example 35 includes the method of example 34, wherein the third BNN is associated with a third weight distribution, the third weight distribution having weights represented as Gaussian distributions.

Example 36 includes an apparatus to facilitate knowledge sharing among neural networks, comprising means for training to train, at a first computing system, a first Bayesian Neural Network (BNN) on a first subset of training data to generate a first weight distribution, and train, at a second computing system, a second BNN on a second subset of the training data to generate a second weight distribution, the second subset of the training data different from the first subset of training data, and means for knowledge sharing to generate a third BNN based on the first weight distribution and the second weight distribution.

Example 37 includes the apparatus of example 36, wherein the first subset of the training data and the second subset of the training data are mutually exclusive.

Example 38 includes the apparatus of example 36, wherein the means for knowledge sharing is a first means for knowledge sharing associated with the first BNN, and further including a second means for knowledge sharing associated with the second BNN.

Example 39 includes the apparatus of example 38, wherein the first means for knowledge sharing is to mix the second weight distribution with the first weight distribution and the second means for knowledge sharing is to mix the first weight distribution with the second weight distribution.

Example 40 includes the apparatus of example 38, wherein the first means for knowledge sharing and the second means for knowledge sharing are a Gaussian Mixture Model.

Example 41 includes the apparatus of example 36, wherein the means for knowledge sharing is implemented using a deterministic neural network.

Example 42 includes the apparatus of example 41, wherein the means for knowledge sharing is to access a first mean and a first variance associated with the first BNN, and a second mean and a second variance associated with the second BNN.

Example 43 includes the apparatus of example 42, wherein the means for knowledge sharing is to generate a third mean and a third variance associated with the third BNN.

Example 44 includes the apparatus of example 43, wherein the third BNN is associated with a third weight distribution, the third weight distribution having weights represented as Gaussian distributions.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to facilitate knowledge sharing among neural networks, the apparatus comprising:
   interface circuitry;
   machine readable instructions; and
   programmable circuitry to at least one of instantiate or execute the machine readable instructions to:
     train, at a first computing system, a first Bayesian neural network (BNN) on a first subset of training data to generate a first weight distribution, wherein the training of the first BNN includes selection of a mean weight and an amount of deviation for the mean weight for each neuron of the first BNN;
     train, at a second computing system, a second BNN on a second subset of the training data to generate a second weight distribution, the second subset of the training data different from the first subset of training data, wherein the training of the second BNN includes selection of a mean weight and an amount of deviation for the mean weight for each neuron of the second BNN;
     generate a group of weights by sampling the first weight distribution and the second weight distribution, wherein a probability that a given weight from the group is sampled from the first weight distribution is equal to a probability that the given weight is sampled from the second weight distribution;
generate a first mixed weight distribution based on the group of weights;
train a third BNN based the first mixed weight distribution instead of the first weight distribution or the second weight distribution;
generate a second mixed weight distribution based on the group of weights, wherein the second mixed weight distribution has a different mean and variance than the first mixed weight distribution; and
train a fourth BNN based on the second mixed weight distribution.

2. The apparatus of claim 1, wherein the first subset of the training data and the second subset of the training data are mutually exclusive.

3. The apparatus of claim 1, wherein the instructions further include knowledge sharing controller instructions associated with the first BNN, the programmable circuitry to at least one of instantiate or execute the knowledge sharing controller instructions to:
generate the first weight distribution;
access the second weight distribution; and
generate the first mixed weight distribution.

4. The apparatus of claim 3, wherein:
the group of weights is a first group of weights; and
the knowledge sharing controller instructions cause the programmable circuitry to:
generate a second group of weights by sampling the first weight distribution and the second weight distribution at different rates; and
use a Gaussian Mixture Model to determine a probability that a given weight from the second group is sampled from the first weight distribution.

5. The apparatus of claim 4, wherein:
samples within the second group of weights are selected based on a first probability of the first BNN and a second probability of the second BNN; and
the programmable circuitry is further to assign the first probability proportional to a number of output classes observed by the first BNN and assign the second probability proportional to a number of output classes observed by the first BNN.

6. The apparatus of claim 1, wherein the instructions further include knowledge sharing controller instructions to cause the programmable circuitry to implement a deterministic neural network (DNN).

7. The apparatus of claim 6, wherein the knowledge sharing controller instructions cause the programmable circuitry to provide a first mean and a first variance associated with the first BNN, and a second mean and a second variance associated with the second BNN, as inputs to the DNN.

8. The apparatus of claim 7, wherein the knowledge sharing controller instructions cause the programmable circuitry to generate, by executing the DNN with the inputs, a third mean and a third variance.

9. At least one non-transitory computer readable medium comprising instructions that, when executed, cause at least one processor to at least:
train, at a first computing system, a first Bayesian neural network (BNN) on a first subset of training data to generate a first weight distribution, wherein the training of the first BNN includes selection of a mean weight and an amount of deviation for the mean weight for each neuron of the first BNN;
train, at a second computing system, a second BNN on a second subset of the training data to generate a second weight distribution, the second subset of the training data different from the first subset of training data, wherein the training of the second BNN includes selection of a mean weight and an amount of deviation for the mean weight for each neuron of the second BNN;
generate a group of weights by sampling the first weight distribution and the second weight distribution, wherein a probability that a given weight from the group is sampled from the first weight distribution is equal to a probability that the given weight is sampled from the second weight distribution;
generate a first mixed weight distribution based on the group of weights;
train a third BNN based on the first mixed weight distribution instead of the first weight distribution or the second weight distribution;
generate a second mixed weight distribution based on the group of weights, wherein the second mixed weight distribution has a different mean and variance than the first mixed weight distribution; and
train a fourth BNN based on the second mixed weight distribution.

10. The at least one non-transitory computer readable medium of claim 9, wherein the first subset of the training data and the second subset of the training data are mutually exclusive.

11. The at least one non-transitory computer readable medium of claim 9, wherein the at least one processor is a first processor associated with the first BNN, and further including a second processor associated with the second BNN.

12. The at least one non-transitory computer readable medium of claim 11, wherein:
the group of weights is a first group of weights; and
the instructions, when executed cause the first processor to:
generate a second group of weights by sampling the first weight distribution and the second weight distribution at different rates; and
use a Gaussian Mixture Model to determine a probability that a given weight from the second group is sampled from the first weight distribution.

13. The at least one non-transitory computer readable medium of claim 12, wherein:
samples within the second group of weights are selected based on a first probability of the first BNN and a second probability of the second BNN; and
the instructions, when executed, cause the at least one processor to assign the first probability proportional to a number of output classes observed by the first BNN and assign the second probability proportional to a number of output classes observed by the first BNN.

14. The at least one non-transitory computer readable medium of claim 9, wherein the at least one processor is implemented using a deterministic neural network (DNN).

15. The at least one non-transitory computer readable medium of claim 14, wherein the instructions, when executed, cause the at least one processor to provide a first mean and a first variance associated with the first BNN, and a second mean and a second variance associated with the second BNN, as inputs to the DNN.

16. The at least one non-transitory computer readable medium of claim 15, wherein the instructions, when executed, cause the at least one processor to generate, by executing the DNN with the inputs, a third mean and a third variance.

17. An apparatus to facilitate knowledge sharing among neural networks, the apparatus comprising:
  at least one storage device; and
  at least one processor to:
    train, at a first computing system, a first Bayesian neural network (BNN) on a first subset of training data to generate a first weight distribution, wherein the training of the first BNN includes selection of a mean weight and an amount of deviation for the mean weight for each neuron of the first BNN;
    train, at a second computing system, a second BNN on a second subset of the training data to generate a second weight distribution, the second subset of the training data different from the first subset of training data, wherein the training of the second BNN includes selection of a mean weight and an amount of deviation for the mean weight for each neuron of the second BNN;
    generate a group of weights by sampling the first weight distribution and the second weight distribution, wherein a probability that a given weight from the group is sampled from the first weight distribution is equal to a probability that the given weight is sampled from the second weight distribution;
    generate a first mixed weight distribution based on the group of weights;
    train a third BNN based on the first mixed weight distribution instead of the first weight distribution or the second weight distribution;
    generate a second mixed weight distribution based on the group of weights, wherein the second mixed weight distribution has a different mean and variance than the first mixed weight distribution; and
    train a fourth BNN based on the second mixed weight distribution.

18. The apparatus of claim 17, wherein the first subset of the training data and the second subset of the training data are mutually exclusive.

19. The apparatus of claim 17, wherein the at least one processor is a first processor associated with the first BNN, and further including a second processor associated with the second BNN.

20. The apparatus of claim 19, wherein:
  the group of weights is a first group of weights; and
  the first processor is to:
    generate a second group of weights by sampling the first weight distribution and the second weight distribution at different rates; and
    use a Gaussian Mixture Model to determine a probability that a given weight from the second group is sampled from the first weight distribution.

21. The apparatus of claim 20, wherein:
  samples within the second group of weights are selected based on a first probability of the first BNN and a second probability of the second BNN; and
  the at least one processor is to assign the first probability proportional to a number of output classes observed by the first BNN and assign the second probability proportional to a number of output classes observed by the first BNN.

22. The apparatus of claim 17, wherein the at least one processor is implemented using a deterministic neural network (DNN).

23. The apparatus of claim 22, wherein the at least one processor is to execute the DNN to generate a third mean and a third variance, wherein a first mean and a first variance associated with the first BNN, and a second mean and a second variance associated with the second BNN, are inputs to the DNN.

* * * * *